United States Patent
Belleschi et al.

(10) Patent No.: US 11,196,516 B2
(45) Date of Patent: Dec. 7, 2021

(54) METHODS FOR AUTONOMOUS UPLINK TRANSMISSIONS AND RETRANSMISSIONS

(71) Applicant: TELEFONAKTIEBOLAGET LM ERICSSON (PUBL), Stockholm (SE)

(72) Inventors: Marco Belleschi, Solna (SE); Mattias Bergström, Sollentuna (SE); Reem Karaki, Aachen (SE); Jung-Fu Cheng, Fremont, CA (US); Mai-Anh Phan, Herzogenrath (DE); Magnus Stattin, Upplands Väsby (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 16/636,438

(22) PCT Filed: Aug. 10, 2018

(86) PCT No.: PCT/IB2018/056051
§ 371 (c)(1),
(2) Date: Feb. 4, 2020

(87) PCT Pub. No.: WO2019/030726
PCT Pub. Date: Feb. 14, 2019

(65) Prior Publication Data
US 2020/0177318 A1 Jun. 4, 2020

Related U.S. Application Data

(60) Provisional application No. 62/544,221, filed on Aug. 11, 2017, provisional application No. 62/563,821, filed on Sep. 27, 2017.

(51) Int. Cl.
*H04L 1/18* (2006.01)
*H04W 76/28* (2018.01)
(Continued)

(52) U.S. Cl.
CPC .......... *H04L 1/1819* (2013.01); *H04L 1/1874* (2013.01); *H04W 24/08* (2013.01);
(Continued)

(58) Field of Classification Search
CPC ... H04L 1/1874; H04L 1/1883; H04L 1/1877; H04L 1/1685; H04L 1/1822;
(Continued)

(56) References Cited

U.S. PATENT DOCUMENTS

| | | |
|---|---|---|
| 2010/0037114 A1 | 2/2010 | Huang |
| 2010/0177701 A1 | 7/2010 | Maheshwari |

(Continued)

FOREIGN PATENT DOCUMENTS

| | | |
|---|---|---|
| JP | 2013017094 A | 1/2013 |
| JP | 2017017633 A | 1/2017 |
| WO | 2016175007 A1 | 11/2016 |

OTHER PUBLICATIONS

International Search Report and Written Opinion issued for International PCT Application PCT/IB2018/056051—dated Dec. 3, 2018.
(Continued)

*Primary Examiner* — Peter P Chau
(74) *Attorney, Agent, or Firm* — Ericsson Inc.

(57) ABSTRACT

There is provided a method, in a wireless device, for communicating with a network node using autonomous Uplink (UL) access. The method comprises: after sending a data transmission to a network node, starting a retransmission window associated with a feedback process of the data transmission, the retransmission window including a first timer; and in response to detecting an absence of a feedback signal during a time period given by the first timer, retransmitting the data after expiry of the first timer.

17 Claims, 12 Drawing Sheets

(51) Int. Cl.
*H04W 24/08* (2009.01)
*H04W 72/04* (2009.01)
*H04W 72/14* (2009.01)
(52) U.S. Cl.
CPC ....... *H04W 72/0493* (2013.01); *H04W 72/14* (2013.01); *H04W 76/28* (2018.02)
(58) Field of Classification Search
CPC . H04W 76/28; H04W 24/08; H04W 72/0493; H04W 72/14
See application file for complete search history.

(56) References Cited

U.S. PATENT DOCUMENTS

| | | | |
|---|---|---|---|
| 2015/0085712 A1* | 3/2015 | Wang | H04L 1/00 370/280 |
| 2016/0242176 A1 | 8/2016 | Ying | |
| 2017/0163388 A1* | 6/2017 | Wiemann | H04W 72/0413 |
| 2018/0110085 A1* | 4/2018 | Tseng | H04L 1/1883 |
| 2018/0367255 A1* | 12/2018 | Jeon | H04L 5/0053 |
| 2018/0368157 A1* | 12/2018 | Jeon | H04L 5/0044 |
| 2018/0368174 A1* | 12/2018 | Jeon | H04W 72/0446 |
| 2018/0368175 A1* | 12/2018 | Jeon | H04W 72/04 |
| 2019/0081743 A1* | 3/2019 | Loehr | H04L 1/1887 |
| 2019/0223035 A1* | 7/2019 | You | H04W 72/1284 |
| 2020/0052830 A1* | 2/2020 | Liu | H04L 1/1896 |

OTHER PUBLICATIONS

3GPP TSG RAN WG2 #93; St. Julian's, Malta; Source: Ericsson; Title: Email discussion report of [92#44][LTE/MTC] MAC Open Items (R2-161734)—Feb. 15-19, 2016, pp. 1-29.

* cited by examiner

FIG. QQ4

METHODS FOR AUTONOMOUS UPLINK TRANSMISSIONS AND RETRANSMISSIONS

RELATED APPLICATIONS

The present application claims the benefits of priority of U.S. Provisional Patent Application No. 62/544,221, entitled "Methods for autonomous UL transmissions and retransmissions", and filed at the United States Patent and Trademark Office (USPTO) on Aug. 11, 2017, and of U.S. Provisional Patent Application No. 62/563,821, entitled "HARQ Methods for autonomous UL access", and filed at the USPTO on Sep. 27, 2017. The content of those two provisional applications is incorporated herein by reference.

TECHNICAL FIELD

The present description generally relates to wireless communication systems and more specifically to autonomous uplink transmissions and retransmissions.

BACKGROUND

The 3GPP work on "Licensed-Assisted Access" (LAA) intends to allow Long Term Evolution (LTE) equipment to also operate in the unlicensed radio spectrum. Candidate bands for LTE operation in the unlicensed spectrum include 5 GHz, 3.5 GHz, etc. The unlicensed spectrum is used as a complement to the licensed spectrum or allows completely standalone operation.

For the case of unlicensed spectrum used as a complement to the licensed spectrum, devices connect in the licensed spectrum (primary cell or PCell) and use carrier aggregation to benefit from additional transmission capacity in the unlicensed spectrum (secondary cell or SCell). The carrier aggregation (CA) framework allows to aggregate two or more carriers with the condition that at least one carrier (or frequency channel) is in the licensed spectrum and at least one carrier is in the unlicensed spectrum. In the standalone (or completely unlicensed spectrum) mode of operation, one or more carriers are selected solely in the unlicensed spectrum.

Regulatory requirements, however, may not permit transmissions in the unlicensed spectrum without prior channel sensing, transmission power limitations or imposed maximum channel occupancy time. Since the unlicensed spectrum must be shared with other radios of similar or dissimilar wireless technologies, a so-called listen-before-talk (LBT) method needs to be applied. LBT involves sensing the medium for a pre-defined minimum amount of time and backing off if the channel is busy. Due to the centralized coordination and dependency of terminal devices on the base-station (such as an eNode B (eNB)) for channel access in LTE operation and imposed LBT regulations, LTE uplink (UL) performance is especially hampered. UL transmissions are becoming more and more important with user-centric applications and the need for pushing data to the cloud.

Today, the unlicensed 5 GHz spectrum is mainly used by equipment implementing the IEEE 802.11 Wireless Local Area Network (WLAN) standard. This standard is known under its marketing brand "Wi-Fi" and allows completely standalone operation in the unlicensed spectrum. Unlike the case in LTE, Wi-Fi terminals can asynchronously access the medium and thus show better UL performance characteristics especially in congested network conditions.

LTE Uplink Scheduling Schemes

In LTE, the uplink access is typically controlled by the eNB, i.e., scheduled. In this case, the UE would report to the eNB when data is available to be transmitted, e.g., by sending a scheduling request message (SR). Based on this, the eNB would grant the resources and relevant information to the UE in order to carry out the transmission of a certain size of data. The assigned resources are not necessarily sufficient for the UE to transmit all the available data. Therefore, it is possible that the UE sends a buffer status report (BSR) control message in the granted resources, in order to inform the eNB about the correct size and updated size of the data waiting for transmission. Based on that, the eNB would further grant the resources to carry on with the UE uplink transmission of the corrected size of data.

In more detail, every time new data arrive at the UE's empty buffer, the following procedure should be performed:

1. Using Physical Uplink Control Channel (PUCCH), the UE informs the network that it needs to transmit data by sending a Scheduling Request (SR) indicating that it needs uplink access. The UE has periodic timeslots for SR transmissions (typically on a 5, 10, or 20 ms interval).

2. Once the eNB receives the SR request bit, it responds with a small "uplink grant" that is just large enough to communicate the size of the pending buffer. The reaction to this request typically takes 3 ms.

3. After the UE receives and processes (takes about 3 ms) its first uplink grant, it typically sends a Buffer Status Report (BSR) that is a MAC Control Element (MAC CE) used to provide information about the amount of pending data in the uplink buffer of the UE. If the grant is big enough, the UE sends data from its buffer within this transmission as well. Whether the BSR is sent depends also on conditions specified in 3GPP TS 36.321.

4. The eNB receives the BSR message, allocates the necessary uplink resources and sends back another uplink grant that will allow the device to drain its buffer.

Adding it all up, about 16 ms (+time to wait for PUCCH transmission opportunity) of delay can be expected between data arrival at the empty buffer in the UE and reception of this data in the eNB.

Another scheduling option specified in LTE is the so-called semi-persistent scheduling (SPS). One or more SPS configurations can be assigned to a certain UE. Each SPS configuration addresses a set of periodically recurring resources which are to be considered as uplink grant for LTE transmissions. The eNB can (de)activate each SPS configuration via Downlink Control Information (DCI) on PDCCH. Once the SPS configuration is activated, the UE can use the associated resources. If an SPS configuration is deactivated, the UE should stop using the associated resources.

An important point in classic uplink LTE scheduling is that there is a fixed one-to-one association between Transmission Time Interval (TTI) and Hybrid Automatic Repeat request (HARQ) Identity (ID). In this way, the eNB has full control of the status of the different HARQ processes.

License Assisted Access

Up to now, the spectrum used by LTE is dedicated to LTE. This has the advantage that the LTE system does not need to care about the coexistence issue and the spectrum efficiency can be maximized. However, the spectrum allocated to LTE is limited, which cannot meet the ever-increasing demand for larger throughput from applications/services. Therefore, Release-13 LAA extended LTE to exploit unlicensed spectrum in addition to licensed spectrum. Unlicensed spectrum can, by definition, be simultaneously used by multiple different technologies. Therefore, LTE needs to consider the coexistence issue with other systems such as IEEE 802.11

(Wi-Fi). Operating LTE in the same manner in unlicensed spectrum as in licensed spectrum can seriously degrade the performance of Wi-Fi as Wi-Fi will not transmit once it detects the channel is occupied.

Furthermore, one way to utilize the unlicensed spectrum reliably is to transmit essential control signals and channels on a licensed carrier. That is, as shown in FIG. 1, a UE is connected to a PCell in the licensed band and one or more SCells in the unlicensed band. In this disclosure, a secondary cell in the unlicensed spectrum is referred to as a licensed-assisted access secondary cell (LAA SCell). In the case of standalone operation such as in MulteFire, no licensed cell is available for uplink control signal transmissions.

HARQ Design

For the LAA, asynchronous HARQ is recommended for LAA UL (PUSCH). That means UL retransmissions may not only occur one RTT (e.g. n+8) after the initial transmission but rather at any point in time. This is considered beneficial in particular when retransmissions are blocked and postponed due to LBT. When introducing asynchronous HARQ, the UE should therefore assume that all transmitted UL HARQ processes were successful (e.g. set local status to ACK). The UE performs a HARQ retransmission for a HARQ process only upon reception of a corresponding UL Grant (NDI not toggled) from the eNB.

Downlink HARQ

After reception of the PDCCH/EPDCCH and associated PDSCH in subframe 'n', the UE shall have the associated HARQ feedback ready for transmission in subframe 'n+4'. The UE shall transmit any pending HARQ feedback at the earliest possible uplink transmission opportunity following the 'n+4' constraint. The uplink transmission opportunity is defined according to either MF-sPUCCH or MF-ePUCCH resources being available for the UE. When transmitting the HARQ feedback associated to the PDSCH, the UE shall collect pending feedback. The pending HARQ feedback may potentially include feedback for several downlink transmissions. The pending HARQ feedback is collected in a bitmap with an implicit association between the index in the bitmap and the HARQ process ID. The size of this bitmap is configurable by the eNB. The maximum number of HARQ processes for DL operation is 16. When signaled in MF-ePUCCH/sPUCCH bitmap, the default status of a HARQ-ID packet is NACK unless there is an ACK available to be sent.

Uplink HARQ

Asynchronous UL HARQ operation was introduced in LTE Rel-13 for eMTC. There is no support for non-adaptive HARQ operation, and the UE shall ignore any information content on the PHICH resources with respect to HARQ operation. The PHICH resources are maintained as part of the downlink transmission resources, but the information content is reserved for future use. Any uplink transmission (new transmission or retransmission) is scheduled through UL grant through PDCCH/EPDCCH. However, also in this type of asynchronous mechanism there is still a relationship between the HARQ IDs and the TTIs, so that the eNB control is still fully possible to some extent. Also, to perform a retransmission, the UE has to wait for an explicit UL grant provided by the network. In particular, the eNB may request a retransmission for a certain HARQ process by not toggling the NDI bit for that HARQ process. The eNB may send the PDCCH to trigger a retransmission of an HARQ process at the expiry of the HARQ RTT associated to that HARQ process or (if configured) at any DRX occasion in which the UE is supposed to monitor the DL channel. For example, in Rel. 14, the eNB has the possibility to configure a DRX retransmission timer (i.e. drx-ULRetransmissionTimer) which is triggered at the expiry of the HARQ RTT. This timer allows the eNB to better counteract possible LBT occurrences which may prevent the eNB from correctly delivering the PDCCH as soon as possible after the HARQ RTT expiry.

Unscheduled Uplink for LAA/MulteFire

For the LTE UL channel access, both UE and eNB need to perform LBT operations corresponding to the scheduling request, scheduling grant and data transmission phases. In contrast, Wi-Fi terminals only need to perform LBT once in the UL data transmission phase. Moreover, Wi-Fi terminals can asynchronously send data compared to the synchronized LTE system. Thus, Wi-Fi terminals have a natural advantage over LTE terminals in UL data transmissions and show superior performance in collocated deployment scenarios as seen in the simulation studies. Overall study results show that Wi-Fi has a better uplink performance than LTE particularly in low-load or less congested network conditions. As the network congestion or load is increased, the LTE channel access mechanism (TDMA type) becomes more efficient, but Wi-Fi uplink performance is still superior. For example, a UE can start the UL transmission without waiting for the permission from the eNB. In other words, a UE can perform LBT to gain UL channel access whenever the UL data arrives without transmitting SR or having an UL grant from the eNB. The UE can use the unscheduled mode for the whole data transmission or alternatively, transmits using unscheduled mode for first N transmission bursts and then switches back to the eNB controlled scheduling mode. SPS grants with granted periodicity down to 1 ms may be useful to achieve similar behavior as autonomous uplink. With periodicity of 1 ms, a UE can attempt to transmit every subframe for the whole granted period.

SUMMARY

In the scheduled access, the UL access is eNB controlled. The eNB grants certain subframes for the uplink transmission. The UE can then attempt to access the channel for the time for which the grant is valid. The eNB expects uplink transmissions only within those subframes. It tries to decode the PUSCH of the granted uplink subframes and based on the decoding result of the PUSCH, the eNodeB should convey an ACK or NACK to the UE.

The situation will not be as straight forward in the unscheduled mode. In the unscheduled mode, the eNB does not know when to expect the Uplink transmission. If the eNB identifies an autonomous uplink transmission, it can send the corresponding acknowledgement to the UE. However, if the eNB missed the uplink transmission from the UE, the UE will not get any feedback for the corresponding HARQ process.

In other words, in LTE, the UL access is granted by the eNB and it occurs in a synchronous way. The UL transmissions and retransmissions always occur at an a-priori known subframe and the UL HARQ process to transmit can be inferred from the transmission time. For example, in FDD, the transmission of a certain HARQ process (identified with an HARQ ID) occurs 4 ms after the reception of an UL grant and retransmissions of that HARQ ID occur 8 ms later from the previous (re)transmission. Similarly, in case of SPS transmissions, TS 36.321 provides a formula which ties a SPS transmission on a certain TTI to a specific HARQ ID. Therefore, in this framework, both the eNB and the UE know when a certain UL transmission can occur and which UL HARQ process the UE will transmit.

On the other hand, in the autonomous UL access framework, UL transmission may still occur at certain specific granted time occasions, but the time relationship between UL grants and UL transmissions, and retransmission, as well as the time relationship between HARQ ID and UL transmission time is lost. This has some clear benefits for the overall UL performances in unlicensed bands where UL transmissions might need to be occasionally dropped due to LBT occurrences.

However, it also poses non-trivial challenges for the eNB scheduler, because the eNB might not know when to expect the uplink transmission and which HARQ process the UE is going to transmit. Additionally, the eNB might correctly receive the UL transmissions, but due to LBT occurrences or due to HARQ feedback losses, the UE might trigger a retransmission in principle at any given point in time, and the eNB might not be aware when and if retransmissions have been triggered by the UE.

Consequence might be an excessive delay in correctly delivering a given HARQ process, or in the worst case retransmissions might be triggered at higher layers (e.g. Radio Link Control (RLC)) in case packets are not correctly received by higher layers on time.

Certain aspects and their embodiments of the present disclosure may provide solutions to these or other problems.

Embodiments of this disclosure allow to configure a semi-persistent scheduling scheme which allows for autonomous and asynchronous uplink access. In particular, the embodiments provide methods to limit latency and increase reliability of autonomous uplink access schemes.

According to one aspect, some embodiments include a method, in a wireless device, for communicating with a network node using autonomous Uplink (UL) access. The method comprises: after sending a data transmission to a network node, starting a retransmission window associated with a feedback process of the data transmission, the retransmission window including a first timer; and in response to detecting an absence of a feedback signal during a time period given by the first timer, retransmitting the data after expiry of the first timer.

In some embodiments, the first timer can be configured to prohibit the wireless device to perform a retransmission of the transmitted data within the time window given by the first timer.

According to another aspect, some embodiments include a wireless device for communicating with a network node using autonomous Uplink (UL) access. The wireless device comprises: processing circuitry and power supply circuitry configured to supply power to the wireless device. The processing circuitry is configured to: after sending a data transmission to a network node, start a retransmission window associated with a feedback process of the data transmission, the retransmission window including a first timer; and in response to detecting an absence of a feedback signal during a time window given by the first timer, retransmit the data after expiry of the first timer.

In some embodiments, the wireless device may comprise one or more communication interfaces configured to communicate with one or more other radio nodes and/or with one or more network nodes, and processing circuitry operatively connected to the communication interface, the processing circuitry being configured to perform one or more functionalities of the wireless device as described herein. In some embodiments, the processing circuitry may comprise at least one processor and at least one memory storing instructions which, upon being executed by the processor, configure the at least one processor to perform one or more functionalities of the wireless device as described herein.

In some embodiments, the wireless device may comprise one or more functional modules configured to perform one or more functionalities of the wireless device as described herein.

According to another aspect, some embodiments include a non-transitory computer-readable medium storing a computer program product comprising instructions which, upon being executed by processing circuitry (e.g., at least one processor) of the wireless device, configure the processing circuitry to perform one or more functionalities of the wireless device as described herein.

Certain embodiments of aspects of the present disclosure may provide one or more technical advantages. For example, with the methods described in this disclosure, it is possible for the network to control the time interval under which retransmission should occur, thereby limiting latency issues and packet loss.

This summary is not an extensive overview of all contemplated embodiments and is not intended to identify key or critical aspects or features of any or all embodiments or to delineate the scope of any or all embodiments. In that sense, other aspects and features will become apparent to those ordinarily skilled in the art upon review of the following description of specific embodiments in conjunction with the accompanying figures.

BRIEF DESCRIPTION OF THE DRAWINGS

Exemplary embodiments will be described in more detail with reference to the following figures, in which.

DETAILED DESCRIPTION

Figure 1:
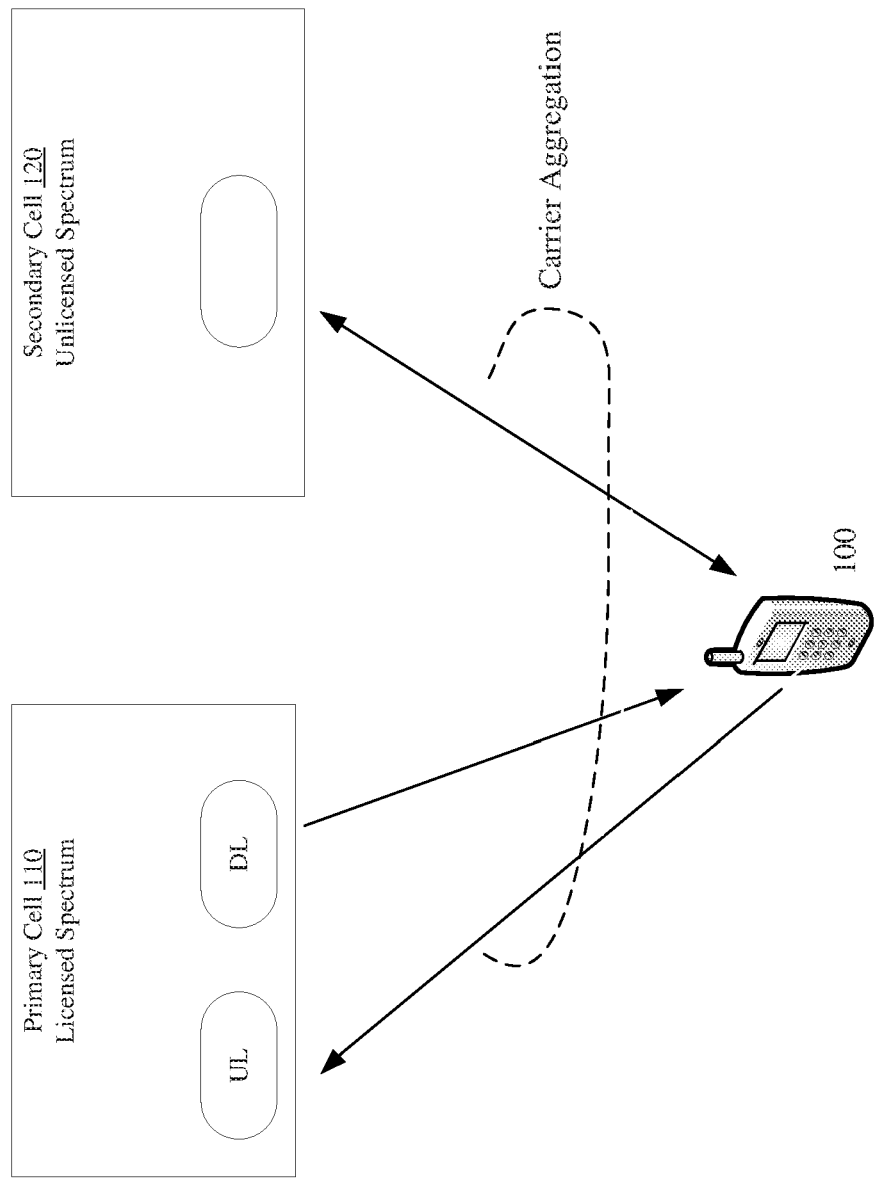
FIG. 1 is a schematic illustration of licensed-assisted access (LAA) to unlicensed spectrum using LTE carrier aggregation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

As used herein, the singular forms "a", "an" and "the" are intended to include the plural forms as well, unless the context clearly indicates otherwise. It will be further understood that the terms "comprises," "comprising," "includes," and/or "including" when used herein, specify the presence of stated features, integers, steps, operations, elements, and/or components, but do not preclude the presence or addition of one or more other features, integers, steps, operations, elements, components, and/or groups thereof.

Many aspects will be described in terms of sequences of actions or functions. It should be recognized that in some embodiments, some functions or actions could be performed by specialized circuits, by program instructions being executed by one or more processors, or by a combination of both.

Further, some embodiments can be partially or completely embodied in the form of computer readable carrier or carrier wave containing an appropriate set of computer instructions that would cause a processor to carry out the techniques described herein.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

In the following, the terminology (or term) "HARQ feedback" can correspond to a signal from the eNB, which indicates to the UE whether a new transmission (i.e. transmitting new packets) can be triggered or whether a retransmission (i.e. retransmitting the previous packets) should be triggered instead. Such signal can be delivered by any DL channel, e.g. via physical downlink control channel (PDCCH), physical Hybrid-ARQ indicator channel (PHICH), physical downlink shared channel (PDSCH), and the content can be either explicit ACK/NACK feedbacks or New Data Indicator (NDI) which carries information on whether the UE is allowed to flush the buffer for a certain HARQ ID or whether a retransmission should be triggered for that HARQ ID.

In the various following embodiments, when the terminology SPS is used, it is intended to refer to a scheduling framework in which a set of time/frequency resources, e.g. represented by a bitmap or by a single time occasion, is periodically available for transmissions according to a configured time pattern.

The following embodiments apply to the case in which autonomous UL access is configured to the UE, irrespective of how the autonomous UL access scheme is configured, e.g. in the form of a SPS, with transmission occasions that recur periodically according to a configured periodicity, or in the form of a bitmap of a certain length which repeats a certain number of times to span the System Frame Number (SFN) length and where each bit indicates whether the UE is allowed to transmit or not in specific subframes.

The following embodiments apply in general, irrespective of the mechanism used for the HARQ feedbacks and the physical channel (e.g. PDCCH or PHICH) which delivers them.

The following embodiments apply to LTE/LAA/Multefire/LTE-U, or any future generation of LTE such as New Radio (NR).

It should be noted that the terms "UE" and "wireless device" are interchangeably used in this disclosure. Also, a UE or a wireless device can represent any terminal devices, which can be a vehicular-UE (such as a vehicle (car, truck, bus, etc.) capable of connecting to a network) and a pedestrian-UE (e.g. cellphone/smartphone).

Generally stated, embodiments of this disclosure allow the UE to transmit or retransmit whenever it can using resources already configured by the eNB. However, it should do that within a certain time window in order to not mess up the RLC reordering procedures at higher layers.

Embodiment 1—Retransmission Window Given by a Prohibit Timer

In this embodiment, the UE is configured with a retransmission window given by a timer, which can be referred to as a retransmission prohibit timer. The retransmission prohibit timer is used to determine when the UE is allowed to perform a retransmission. Since HARQ feedback may be lost or simply not transmitted because of LBT occurrences, the role of the retransmission prohibit timer is to allow the eNB to have more occasions to send an HARQ feedback for an HARQ process not yet acknowledged.

A retransmission prohibit timer is associated with a certain HARQ process, and at the expiry of the timer, the UE is allowed to perform an UL retransmission of a previously transmitted HARQ process. The UL retransmission can be performed at the first granted transmission occasion after the timer expiry, or following methods disclosed in embodiment 2.

The retransmission prohibit timer can be triggered at any of the following occurrences:

1. After performing a PUSCH transmission or retransmission.
2. At the expiry of the HARQ RTT if no HARQ feedback is received at the expiry of the HARQ RTT.
3. At the expiry of the DRX retransmission timer (i.e. drx-ULRetransmissionTimer) which, in turn, is triggered at the expiry of the HARQ RTT, if no HARQ feedback is received before the expiry of the DRX retransmission timer:
   i. If the DRX retransmission timer is not configured, the UE triggers the retransmission timer at the expiry of the HARQ RTT.
4. After the DRX retransmission timer (i.e. drx-ULRetransmissionTimer) is triggered.
5. After the UE requesting feedback. As a non-limiting example, the UE sends a HARQ feedback request via Uplink control signaling (UCI).

For all the 5 options above, the retransmission prohibit timer is stopped and cleared upon reception of the HARQ feedback for the HARQ process to which this retransmission timer is associated. A new retransmission prohibit timer associated to this HARQ process can be initiated and started once a retransmission is performed, following one of the options listed above.

Figure 2:
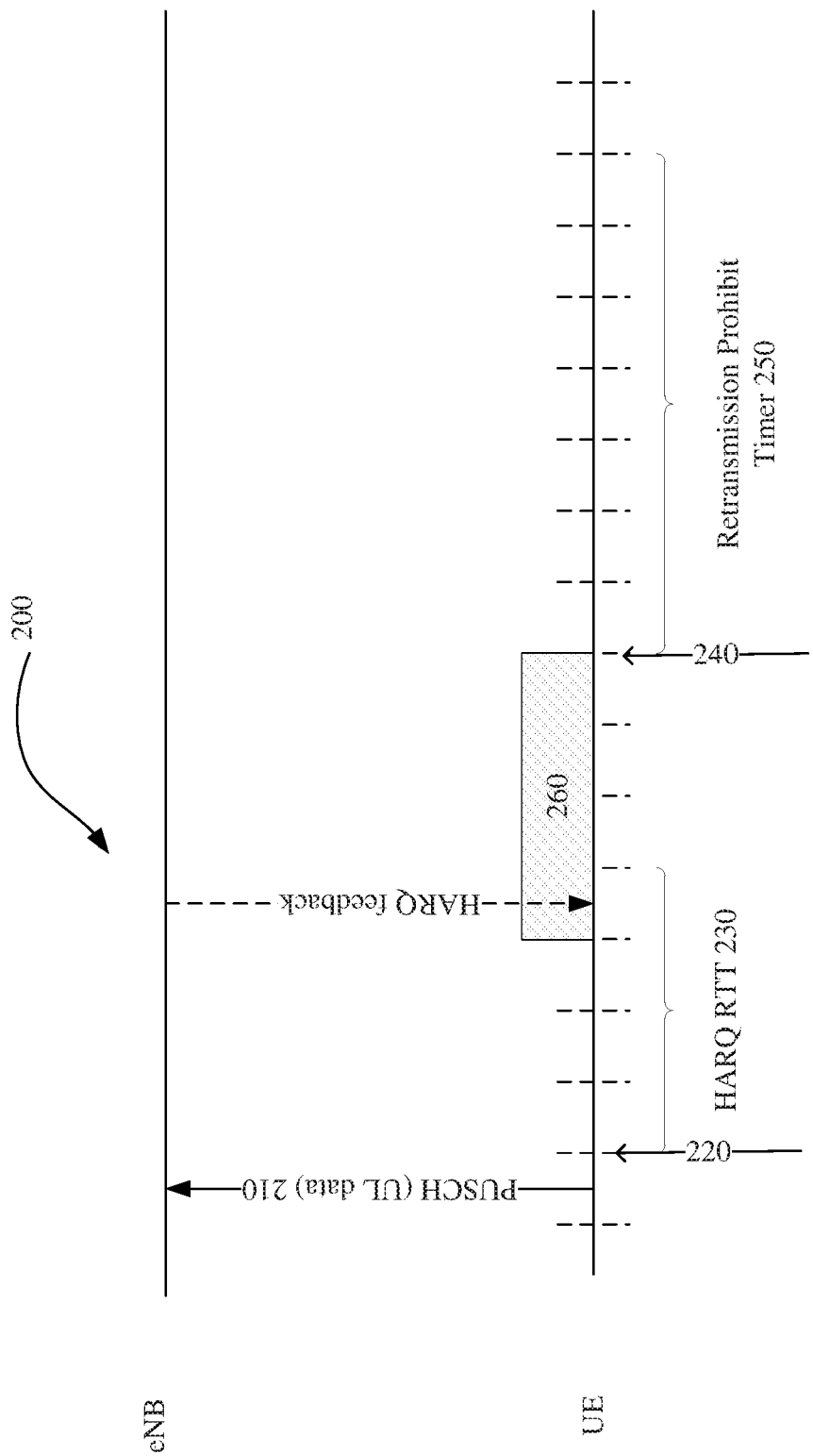
FIG. 2 illustrates an exemplary retransmission mechanism comprising a retransmission prohibit timer, according to an embodiment.

FIG. 2 illustrates an example of a retransmission mechanism 200, as described according to embodiment 1 with option 3.

In step 210, the UE sends an uplink data transmission to the eNB, the uplink data transmission being associated with a corresponding HARQ ID. Upon transmission of the UL data associated with the HARQ ID, the UE triggers an HARQ RTT timer 230, at step 220. The UE can also trigger a DRX retransmission timer 260, after the HARQ RTT timer 230 is triggered. In step 240, the UE then triggers the retransmission prohibit timer 250, after the expiry of the HARQ RTT timer 230 and the DRX retransmission timer 260, for example, if no HARQ feedback is received within those timers (i.e. the arrow in dash of FIG. 2 shows that no HARQ feedback is received by the UE within the time set by the timers 230 and 260). As described above, the retransmission prohibit timer 250 can be also triggered with other factors.

Once the retransmission prohibit timer 250 is triggered, it means that the UE is not allowed to perform a retransmission during the time period set by the prohibit timer 250. Once the prohibit timer 250 expires, then the UE is allowed to perform a retransmission. If during the time period set by the prohibit timer 250, the UE receives a HARQ feedback, then the UE stops the retransmission prohibit timer 250.

In a variant of this embodiment, a retransmission prohibit counter can be used to determine when the UE is allowed to perform a retransmission, rather than a timer (which counts the time). The counter can be stepped (or increased) when a certain event, e.g. a retransmission, occurs. Alternatively, the counter can be stepped for each TTI in which the UE expects to receive an HARQ feedback from the network node, but no HARQ feedback is received for the corresponding HARQ process. For example, the retransmission prohibit counter is initiated at the expiry of the HARQ RTT, and it is stepped for all subframes in which the UE is awake to monitor the DL channel (e.g. during all DRX occasions like onDurationTimer, drx-InactivityTimer, drx-ULRetransmissionTimer) but no HARQ feedback is received for the corresponding HARQ ID. As such, the counter is not stepped/increased when the UE is in the DRX sleeping mode. The retransmission prohibit counter is cleared, if a retransmission is received at the network node, i.e. a HARQ feedback is received by the UE.

Different values for the retransmission prohibit timer 250 or counter can be configured. The retransmission prohibit timer 250 can be configured by the eNB to cover more than one DRX occasions, e.g. not only to cover the drx-ULRetransmissionTimer, but also to cover DRX onDurationTimer which occurs periodically depending on the DRX cycle configuration. This allows the network node to have more chances to deliver the HARQ feedbacks in case of several LBT occurrences. If the timer/counter is not configured or set to infinity, the UE is not allowed to perform retransmissions of a certain HARQ ID until an explicit HARQ feedback for that HARQ ID is received from the network node.

Embodiment 2—Retransmission Window Given by a Retransmission Timer

In this embodiment, at the expiry of the retransmission prohibit timer 250 associated with a corresponding HARQ ID, the UE can initiate a retransmission window for this HARQ ID, within which the UE needs to perform a retransmission corresponding to the HARQ ID. The retransmission window is needed in order to avoid that the UE uses too much time to perform a retransmission and possibly impacting RLC reordering procedures, for example.

If the UE performs the retransmission within the retransmission window, the retransmission window is cleared (i.e. it ends). Otherwise, the retransmission window would eventually expire, upon which a retransmission counter is stepped i.e. it is stepped up (or stepped down depending on how the counter is implemented) even if the UE did not perform the retransmission, because of LBT or any other reasons. At the expiry of the retransmission window, a new retransmission window can start. The retransmission counter is used to count the number of retransmission windows. If the UE manages to transmit the UL retransmission within the retransmission window, then methods disclosed in Embodiment 1 can be used to track the HARQ process associated with this retransmission, e.g. the UE triggers the retransmission prohibit timer 250 following the expiry of the HARQ RTT 230 associated with the retransmission.

For example, the retransmission window can be configured by the eNB which determines when the retransmission for a certain HARQ process, identified by an HARQ ID, should be triggered.

The retransmission window can be controlled by a timer, which can be referred to as a retransmission timer.

Different retransmission timers can be set for different Logical Channel Identity (LCIDs). For example, shorter retransmission timers can be used for higher priorities LCIDs in order to reduce delivery latency of high-priority traffic. Alternatively, different retransmission timers can be configured by the eNB for different channel conditions, i.e. short timers for when the interference is deemed to be small and the probability of LBT occurrences is small.

There can be one time window per HARQ process and optionally one time window per retransmission attempt. The time window can be expressed by a timer (or by the number of TTIs/subframes) which is configured by the network. One method to set this timer is to configure it to be strictly smaller than a reordering timer, such as the RLC t-Reordering timer, which triggers the RLC receiving entity to advance the RLC receiving window and to inform the transmitting entity to trigger a retransmission of the RLC PDU. For example, the value of the retransmission timer may depend on the maximum number of retransmission attempts for a MAC PDU, e.g. there is a retransmission timer associated with each retransmission attempt. And the higher the number of allowed retransmission attempts, the shorter the timer is, and vice-versa. A configuration rule could be that the length of the sum of the retransmission timers values (configured by the network) is strictly smaller than the RLC re-ordering value.

Alternatively, the retransmission timer can be expressed in terms of numbers of subframes in which there are granted resources for UL transmissions. Therefore, in this case the retransmission timer is stepped (or increased) for every subframe in which there are granted resources for UL transmissions and it is not stepped for subframes in which there are no granted resources.

Figure 3:
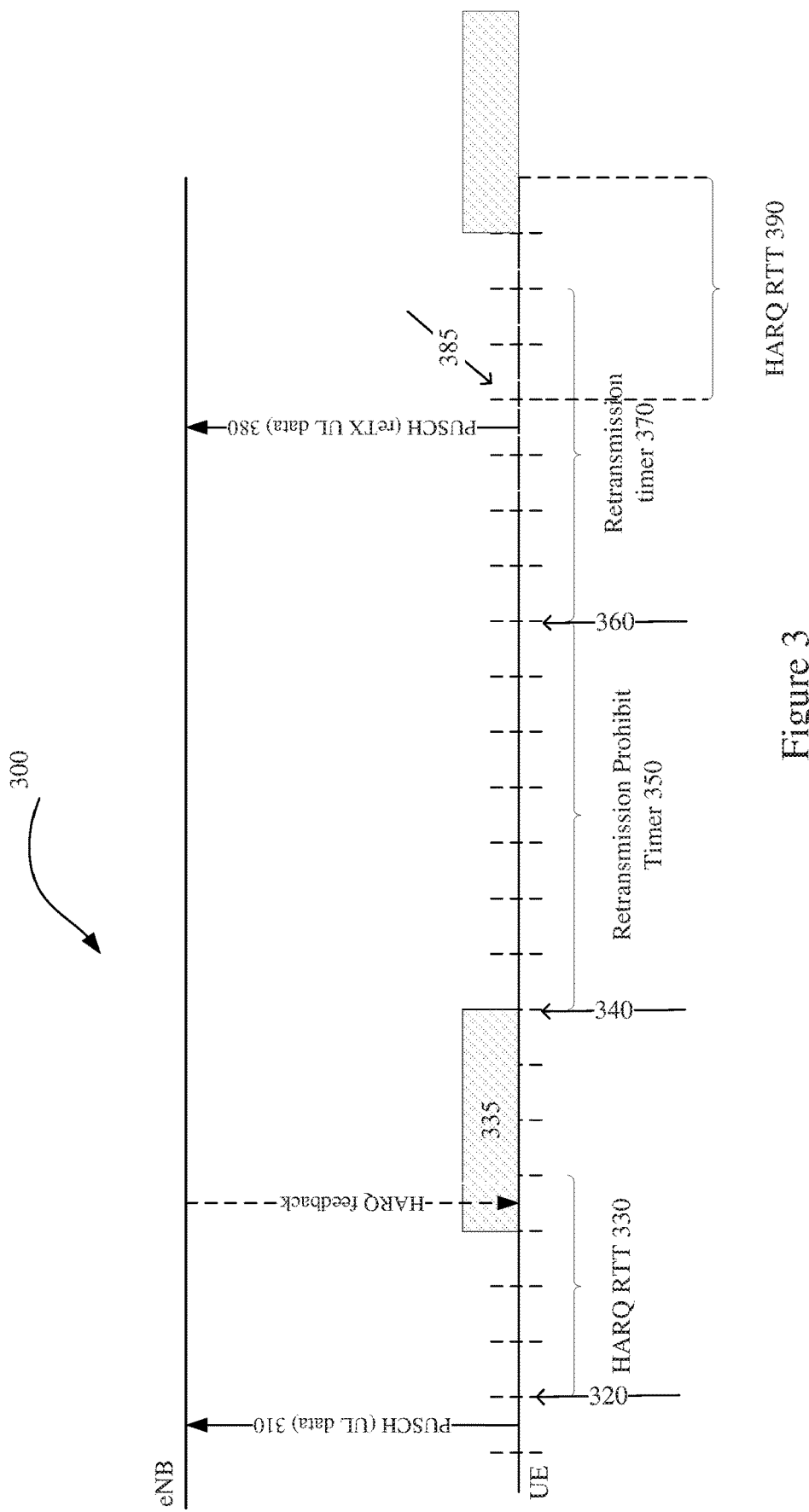
FIG. 3 illustrates an exemplary retransmission mechanism comprising a retransmission prohibit timer and a retransmission window, according to an embodiment.

FIG. 3 illustrates an example of the retransmission mechanism 300, according to embodiment 2.

In step 310, the UE sends an uplink data transmission to the eNB, the uplink data transmission being associated with a corresponding HARQ ID. Upon transmission of the UL data associated with the HARQ ID, the UE triggers an HARQ RTT timer 330, at step 320. The UE can also trigger a DRX retransmission timer 335, after the HARQ timer 330 is triggered. In step 340, the UE triggers the retransmission prohibit timer 350, at the expiry of the HARQ RTT timer 330 and the DRX retransmission timer 335, for example, if no HARQ feedback is received (the arrow in dash shows that no HARQ feedback is received by the UE within the time set by the timers 330 and 335). At the expiry of the retransmission prohibit timer 350, the UE starts a retransmission window (step 360), controlled by a retransmission timer 370. During the time period set by the retransmission timer 370, the UE is allowed to send a retransmission of the previously transmitted data. If no HARQ ACK is received during the time period set by the retransmission timer 370, then, the UE sends a retransmission (step 380) to the eNB. After this retransmission, in step 385, the UE clears or stops the retransmission timer 370. Also, following the retransmission 380, the UE starts a HARQ RTT timer 390. Method 200 can be used to track the HARQ process corresponding to this retransmission.

In case the UE receives an HARQ feedback when the retransmission timer 370 is pending, the UE can stop the pending retransmission timer 370, in one example. Later on, the UE can schedule either a new transmission (if the HARQ feedback contains an ACK) or a retransmission (if the HARQ feedback contains a NACK). More specifically, if ACK is received, the retransmission timer 370 is stopped and it is not reset before the next transmission for this HARQ process. At the next transmission for this HARQ process, the UE will schedule new data for this HARQ ID, reset the Redundant Version Indicator (RVI), toggle the NDI, and reset the retransmission counter.

If the HARQ feedback is a NACK, the retransmission timer 370 is not reset. Instead, it is reset after the retransmission. If the retransmission is not performed, the UE discards the current retransmission attempt. Alternatively, if the HARQ feedback contains a NACK, the retransmission timer 370 is stopped and reset immediately after. This is important in order to ensure that a retransmission for this HARQ process occurs within the time period set by the retransmission timer 370. Therefore, at reception of the HARQ feedback, the UE does not toggle the NDI, it may step the RVI and the retransmission counter.

In another alternative, the retransmission timer 370 can cover all the possible retransmission occasions for a given HARQ process. In this case, the retransmission timer 370 is not stopped and reset after each retransmission, rather the retransmission timer 370 goes until it expires or an HARQ feedback with ACK is received. After expiry of the retransmission timer 370, the UE can trigger a new transmission for this HARQ process.

In yet another example, the retransmission timer 370 is not stopped if an HARQ feedback is received during the duration of the time period given by the retransmission timer 370. The retransmission counter is stepped whenever the retransmission timer 370 expires, and whenever a UE performs a retransmission.

In case the retransmission counter reaches a maximum configurable amount of retransmission attempts, the UE buffer related to this HARQ process can be flushed and the corresponding packet is discarded, i.e. a new packet, if available, is processed for this HARQ ID, the RVI counter is reset, the NDI is toggled, and the retransmission counter is reset.

Embodiment 3—HARQ Retransmission Window

In this embodiment, a HARQ retransmission window given by a timer (herein referred to as a HARQ window timer) is used to indicate the maximum time allowed to successfully complete an HARQ process. Or in other terms, there is a maximum time allowed for the UE to transmit a certain transport block/data from a certain HARQ process and after this time the UE is no longer allowed to transmit that transport block from that HARQ process.

This can be implemented by the UE such that if an HARQ acknowledgement sent by the network node, either indicating ACK or NDI toggled for this HARQ ID, is not received within the retransmission window, the UE would not be allowed to continue to transmit the transport block from that HARQ process. The UE may flush the buffer associated with this HARQ process and/or be allowed to perform a new transmission (i.e. with a new transport block) for this HARQ process by toggling NDI and resetting the RVI.

Therefore, a UE can flush the buffer either after a maximum number of retransmissions is reached, or no successful transmissions are performed within the HARQ retransmission window. The HARQ retransmission window can be configured irrespective of whether the retransmission timer is configured or not, for example. The HARQ retransmission window/timer can be initiated based on similar conditions/factors as the ones disclosed in Embodiment 1 with regards to the retransmission prohibit timer. For example, the HARQ window timer can be initiated immediately after the initial transmission, or at the expiry of the HARQ RTT, or at expiry of the first DRX occasion/timer following the expiry of the HARQ RTT, etc.

Furthermore, in one example, when the HARQ window timer for a given HARQ process expires, the UE does not do anything and waits for the HARQ feedback from the eNB for this HARQ process.

In another example, the HARQ window timer is considered to end when the UE retransmits a certain RLC Protocol Data Unit (PDU)/Service Data Unit (SDU) (or other higher layer retransmission, such as Packet Data Convergence Protocol (PDCP)/Radio Resource Control (RRC) PDU/SDU in case a retransmission scheme is introduced in the PDCP/RRC layer). In the following, RLC will be used as an example. For instance, if the UE transmits an RLC PDU/SDU A in a transport block X, the UE would then maintain an HARQ retransmission window applicable for the HARQ process used to transmit transport block X, in which RLC PDU/SDU A is contained. If later, the RLC PDU/SDU A is being retransmitted, the UE would not be allowed to transmit the transport block X anymore since RLC PDU/SDU A is being retransmitted (which would be done in another transport block such as Y). The benefit of this is that a certain RLC PDU/SDU would only be allowed to be transmitted in one transport block at any point in time. This can be implemented in several ways, for example, an indication may be provided from an RLC entity in the UE to the Medium Access Control (MAC) or PHY entity in the UE, which indicates that the RLC entity is performing a retransmission of a certain PDU/SDU. Another approach is that the HARQ retransmission window is defined by a timer which is configured to a value considering the time between (re)transmissions of a certain RLC PDU/SDU.

Figure 4:
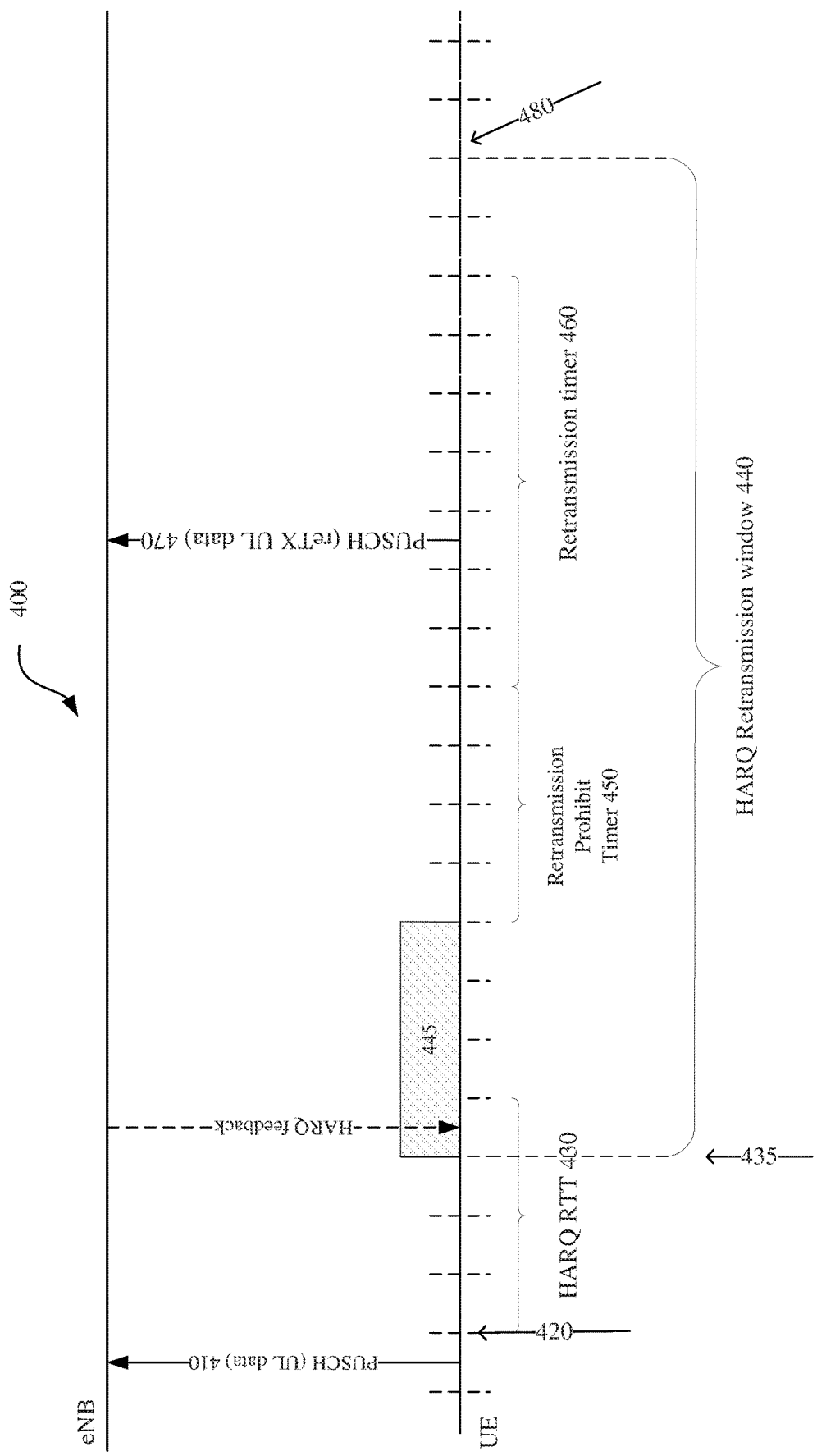
FIG. 4 illustrates an exemplary retransmission mechanism comprising a HARQ retransmission window, according to an embodiment.

FIG. 4 illustrates one example of the retransmission mechanism 400 according to embodiment 3.

In step 410, the UE sends an uplink data transmission to the eNB, the uplink data transmission being associated with a corresponding HARQ ID. Upon transmission of the UL data associated with the HARQ ID, the UE triggers a HARQ RTT timer 430 at step 420.

Then, the UE may trigger a HARQ retransmission window or retransmission window 440 at step 435. The HARQ retransmission window 440 may comprise, a DRX retransmission timer 445, a retransmission prohibit timer 450, and a retransmission timer 460. The retransmission prohibit timer 450 can be triggered at the expiry of the HARQ RTT timer 430 or at the expiry of the DRX retransmission timer 445, for example, if no HARQ feedback is received during the time window given by those 2 timers. The retransmission timer 460 can be triggered at the expiry of the retransmission prohibit timer 450. During the time window given by the retransmission timer 460, the UE is allowed to send a retransmission of the previously transmitted data. If no HARQ ACK is received during the retransmission timer 460, then, the UE sends a retransmission (step 470) to the eNB within the retransmission timer 460. After this retransmission, the UE can clear or stop the retransmission timer 460. If, at the end of the HARQ retransmission window 440, no ACK is received or NDI is toggled for the retransmission, the UE flushes the buffer, in step 480.

It should be noted that within the HARQ retransmission window 440, several retransmission timers 460 can be configured.

Embodiment 4—New Grant Reception

Embodiment 4 provides some methods that the eNB can use to override (or cancel) the autonomous UE access scheme. For example, the eNB can provide explicit scheduling allocation for a certain HARQ ID. To do so, the eNB can send a dynamic UL grant for the specific HARQ ID. The UL grant is a PDCCH grant, for example, which can override an existing SPS configuration, for example. Such command can contain an explicit flag to indicate that dynamic scheduling should be applied. For example, it can contain the HARQ ID of the HARQ process which is supposed to use the grant included in this PDCCH. As such, when the UE receives the UL grant, the UE will transmit the HARQ ID at a fixed time, e.g. n+4.

The grant received at time n can either be a single grant to be used at n+4 (dynamic scheduling is used, i.e. grant not scrambled with SPS-Radio Network Temporary Identifier (RNTI)) or it can contain an indication of other SPS resources (e.g. Modulation Coding Scheme (MCS), Physical Resource Blocks (PRBs) with grant scrambled with SPS-RNTI) to be used in place of the current SPS resources (SPS scheduling is used). In case multiple SPS configurations are configured for the UE, the grant can also contain an indication of which of the multiple SPS configurations (e.g. an index to the desired SPS configuration) the UE should use for this HARQ ID.

This PDCCH grant shall therefore contain the HARQ ID of the process which should follow the grant included in this PDCCH, the transmitting resources to be used, and possibly an indication of whether the UE should transmit new data (i.e. flush the buffer) when using such resources. Such indication can be represented by the NDI as in legacy systems (e.g. NDI=0 indicates a new transmission, NDI=1 indicates a retransmission, or NDI toggled indicates a new transmission, NDI not toggled indicates a retransmission). Alternatively, this PDCCH command is delivered by the eNB together with the HARQ feedback and the UE should follow the indication on the HARQ feedback. For example, if the bit associated with the HARQ process ID in the HARQ feedback is 0, the UE retransmits this packet using the resources indicated for this HARQ ID in the PDCCH. If no new resources are allocated in the PDCCH for this HARQ ID, the UE can use the previously granted resources for any new transmissions and retransmissions.

If the PDCCH grant contains some NDI information for this HARQ process ID, the UE stops an ongoing retransmission timer, if any. The UE performs a UL transmission or retransmission according to the scheduling indication provided in the PDCCH command Depending on which type of resources are scheduled for the UE (grant scrambled with SPS-RNTI or not), the UE may or may not start the retransmission timer upon the UL transmission.

For example, if the granted resources are just valid for one transmission or retransmission of a certain HARQ process ID in only one transmitting occasion (e.g. grant not scrambled with SPS-RNTI), the UE performs the transmission or retransmission associated with these granted resources and it should wait for further PDCCH grants by the eNB before performing further retransmissions or new transmissions for this HARQ ID.

Alternatively, the eNB can explicitly indicate in the PDCCH grant whether the UE should wait for further PDCCH grants before performing a retransmission of this HARQ ID or whether it is allowed to start a retransmission timer after the UL transmission and perform a retransmission within such a retransmission timer.

Embodiment 5—Actions to Solve HARQ Retransmission Failures

Embodiment 5 applies to the methods of any of the Embodiments 1, 2, 3 and 4, in which specific UE and eNB actions are needed to recover from a lack of HARQ feedback (e.g. due to LBT failures in the DL transmission of the HARQ feedback, or HARQ feedback not received by the UE).

In some cases, the UE sends PUSCH (re)transmissions for a certain HARQ ID, but the eNB may not be able to detect them, e.g. because of interference or band channel quality (DTX). Since there is no association between HARQ IDs and TTIs, the eNB does not know which process the UE is trying to deliver. The eNB may send/trigger HARQ feedback for an HARQ process ID by performing the following:

The eNB may send periodic HARQ feedback. In this case, the eNB may use a timer to trigger such HARQ feedback.

In another case, the eNB provides an UL explicit dynamic scheduling grant for transmission on a specific subframe for HARQ process IDs which the UE has not used for a certain time.

In another case, the eNB multiplexes the HARQ feedback with upcoming DL transmissions. As a non-limiting example, a HARQ feedback is multiplexed with Discovery Reference Signal (DRS) transmissions.

Upon multiple attempts to provide HARQ feedback and no transmissions from the UE, the eNB may deactivate (or deconfigure) the carrier in which UL transmissions for a certain HARQ ID cannot be delivered.

Additional actions can be performed by the eNB. If UL performances are bad, e.g. if the HARQ retransmission window 440 expires for one or more times, and/or if the maximum allowed number of retransmissions is reached for a given HARQ process, and/or if several consecutive LBT failures occur, the following actions could be considered:

The eNB starts performing cross carrier scheduling of the problematic UL cell from any of the DL licensed cells or from another DL unlicensed cell which is not currently experiencing problems (e.g. low LBT occurrences).

The eNB stops using the autonomous UL access configuration and starts using dynamic scheduling for the problematic HARQ ID. In this case, the UL (re)transmission of a certain HARQ ID would occur at a specific subframe which is known by both the UE and eNB. This action can possibly be performed even without triggering a new transmission for the problematic HARQ process The eNB deactivates (or deconfigures) the problematic UL cell.

The eNB triggers a partial MAC reset for the problematic UL cell or alternatively only for the problematic HARQ process, which e.g. implies that all the timers and counters disclosed in the previous embodiments are cleared and reset.

The eNB's actions can be either directly triggered by the eNB or upon UE request.

In the first case, the eNB may not be aware of the HARQ retransmission window and of how many retransmissions the UE has already performed. As such, the eNB may count how often UCIs on PUSCH are received with NDI toggled, even though the eNB did not explicitly acknowledge that HARQ process. After one or more occurrences of received UCI with NDI toggled and with no acknowledgement yet sent, the eNB triggers the above actions. The above actions can also be triggered in case of multiple consecutive occurrences of LBT in DL or LBT occurrences in DL in a given time period higher than a certain threshold.

In the second case, it is the UE that informs the eNB about problems occurring in the unlicensed cell, e.g. some information is sent in a dedicated RRC message like the UEAssistanceInformation message. Triggering of the message could be based on the following:

Consecutive LBT occurrences in UL, or LBT occurrences higher than a certain threshold in a given time period;

Consecutive occurrences of NDI toggling (e.g. because of HARQ retransmission window expiry, or maximum HARQ retransmissions reached) with no acknowledgment received from the network node for the same HARQ process or for more than one HARQ processes.

The message may contain different fields which may indicate for example, the reason why the UE is requesting special eNB actions (e.g. LBT failures occurred a certain number of time, or HARQ process not acknowledged within a certain time period, etc.), the cell in which the issue has been detected, the affected HARQ process ID(s).

Figure 5:
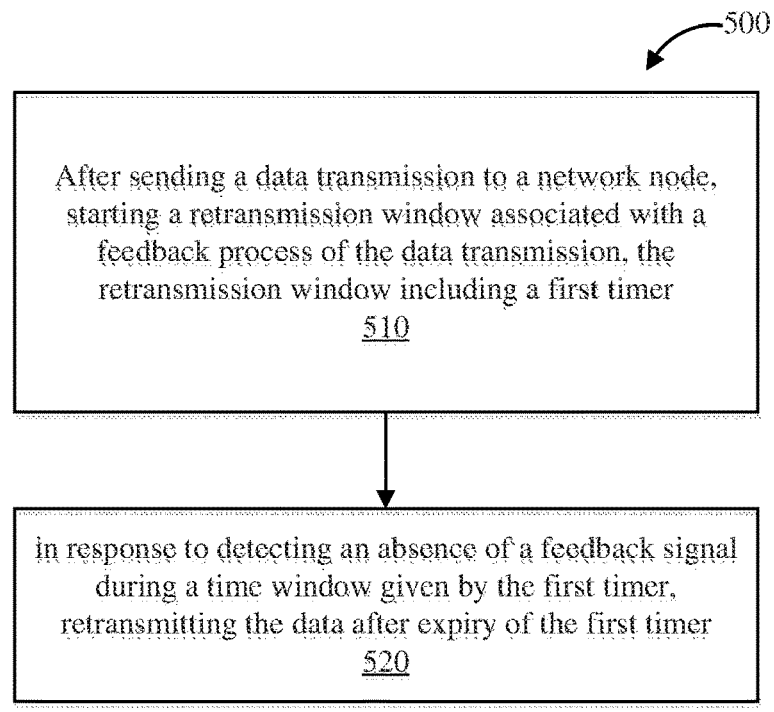
FIG. 5 illustrates a flow chart of a method in a wireless device, according to an embodiment.

Now turning to FIG. 5, a method 500 for communicating with a network node using autonomous UL access will be described. The method can be implemented in a wireless device or UE (such as QQ110 as described in FIG. 7). The network node can be the network node QQ160 of FIG. 7.

Method 500 comprises:

After sending a data transmission to a network node, starting a retransmission window associated with a feedback process of the data transmission, the retransmission window including a first timer (block 510); and In response to detecting an absence of a feedback signal during a time period given by the first timer, retransmitting the data after expiry of the first timer (block 520).

For example, the first timer may be the prohibit timer 250, 350, or 450 and is configured to prohibit the wireless device to perform a retransmission of the transmitted data within the time period given by the first timer.

The retransmission window may be the HARQ retransmission window 440.

In some embodiments, the feedback process of the data transmission may comprise a Hybrid Automatic Repeat request (HARQ) feedback process and the first timer may be associated with a HARQ identifier of the HARQ feedback process associated with the data transmission (or transmitted data).

In some embodiments, sending the data transmission may comprise sending a retransmission of the transmitted data.

In some embodiments, the first timer may be triggered after sending the data transmission to the network node, after an expiry of a HARQ round-trip (HARQ RTT) timer during which no feedback signal associated with the transmitted data is received, after an expiry of a discontinuous reception (DRX) retransmission timer during which no feedback signal associated with the transmitted data is received, after triggering the discontinuous reception (DRX) retransmission timer, or, after sending a feedback request to the network node.

In some embodiments, the first timer can be stopped upon reception of the feedback signal during the time period given by the first timer.

In some embodiments, the retransmission window may further include a second timer. The second timer may be the retransmission timer 460, which is configured to allow the wireless device to perform a retransmission of the transmitted data during that time period given by the retransmission timer.

In some embodiments, the second timer can be triggered at the expiry of the first timer.

In some embodiments, the second timer can be configured to be smaller than a reordering timer.

In some embodiments, another second timer (or a second retransmission timer 460) can be triggered after the second timer (or retransmission timer 460) expires if no retransmission of the transmitted data is performed during a time period given by the second timer.

In some embodiments, a counter of the second timer (or a counter of retransmission timer 460) can be triggered or initiated for monitoring a number of times that the second timer 460 is triggered.

In some embodiments, the second timer 460 can be stopped upon receipt of the feedback signal during the time period given by the second timer 460.

In some embodiments, the retransmission window 440 may be triggered based on after expiry of a HARQ RTT timer or after expiry of a DRX timer.

In some embodiments, the wireless device may flush a buffer of the wireless device at expiry of the retransmission window.

In some embodiments, the wireless device may receive a signal indicating an uplink grant for the feedback signal and in response to the receipt of the uplink grant signal, it stops the retransmission window 440.

In some embodiments, the wireless device may be configured with a SPS configuration. Furthermore, the wireless device may stop the SPS configuration upon receipt of the signal indicating the uplink grant.

Figure 6:
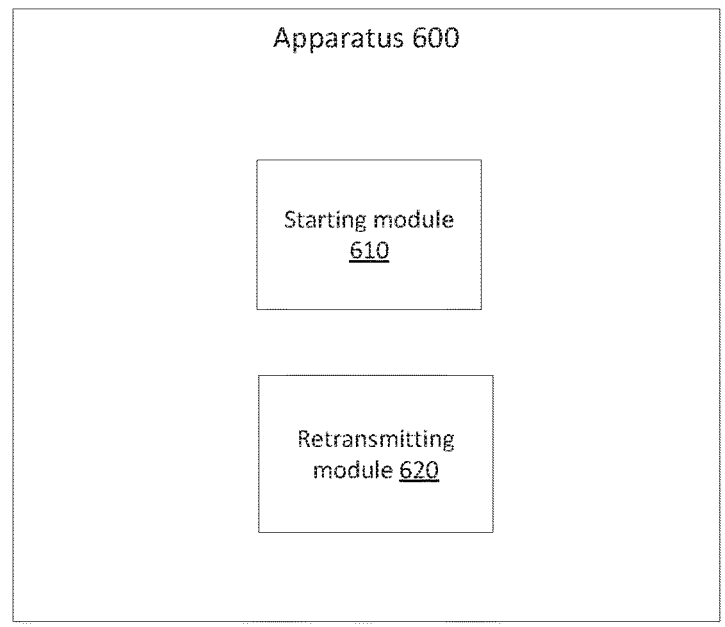
FIG. 6 illustrates a virtualization apparatus, according to an embodiment.
Figure 7:
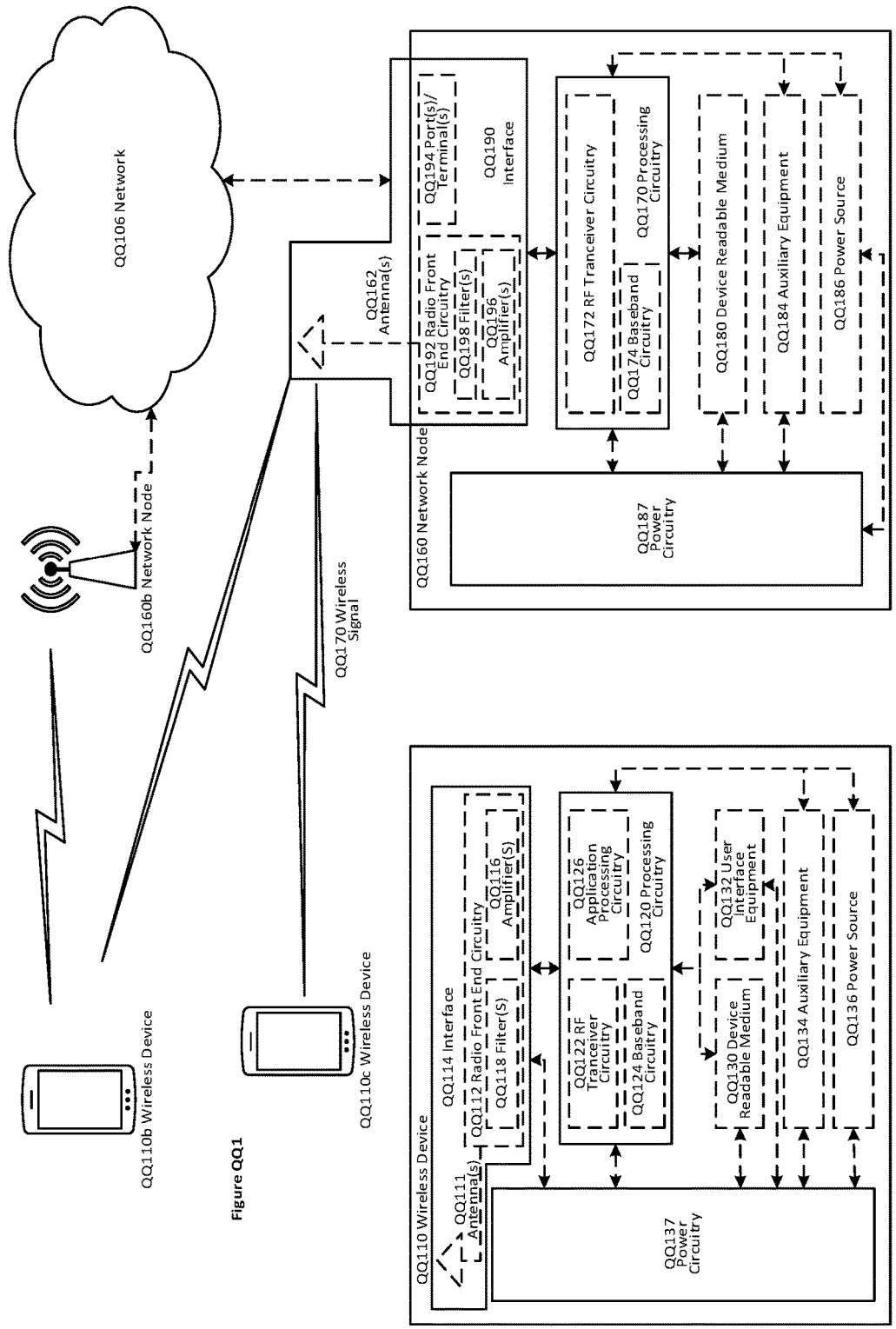
FIG. 7 illustrates a schematic block diagram of a wireless network, according to an embodiment.

FIG. 6 illustrates a schematic block diagram of an apparatus 600, in a wireless network (for example, the wireless network shown in FIG. 7). The apparatus may be implemented in a wireless device (e.g., wireless device QQ110 shown in FIG. 7). Apparatus 600 is operable to carry out the example method described with reference to FIG. 5 and possibly any other processes or methods disclosed herein. It is also to be understood that the method of FIG. 5 is not necessarily carried out solely by apparatus 600. At least some operations of the method can be performed by one or more other entities.

Virtual Apparatus 600 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause the starting unit/module 610 and the retransmitting unit/module 620 and any other suitable units of apparatus 600 to perform corresponding functions according one or more embodiments of the present disclosure.

As illustrated in FIG. 6, apparatus 600 includes the starting unit 610 and the retransmitting unit 620. The starting unit 610 is configured to perform at least block 510 of method 500. The retransmitting unit 620 is configured to perform at least block 520 of method 500.

Although the solutions described in this disclosure may be implemented in any appropriate type of system using any suitable components, particular embodiments of the described solutions may be implemented in a wireless network such as the example wireless communication network illustrated in FIG. 7.

For simplicity, the wireless network of FIG. 7 only depicts network QQ106, network nodes QQ160 and QQ160b, and WDs QQ110, QQ110b, and QQ110c. In practice, a wireless network may further include any additional elements suitable to support communication between wireless devices or between a wireless device and another communication device, such as a landline telephone, a service provider, or any other network node or end device. Of the illustrated components, network node QQ160 and wireless device (WD) QQ110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network QQ106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node QQ160 and WD QQ110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 7, network node QQ160 includes processing circuitry QQ170, device readable medium QQ180, interface QQ190, auxiliary equipment QQ184, power source QQ186, power circuitry QQ187, and antenna QQ162. Although network node QQ160 illustrated in the example wireless network of FIG. 7 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node QQ160 are depicted as single boxes located within a larger box, or nested within multiple boxes, in practice, a network node may comprise multiple different physical components that make up a single illustrated component (e.g., device readable medium QQ180 may comprise multiple separate hard drives as well as multiple RAM modules).

Similarly, network node QQ160 may be composed of multiple physically separate components (e.g., a NodeB component and a RNC component, or a BTS component and a BSC component, etc.), which may each have their own respective components. In certain scenarios in which network node QQ160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node QQ160 may be configured to support multiple radio access technologies (RATs). In such embodiments, some components may be duplicated (e.g., separate device readable medium QQ180 for the different RATs) and some components may be reused (e.g., the same antenna QQ162 may be shared by the RATs). Network node QQ160 may also include multiple sets of the various illustrated components for different wireless technologies integrated into network node QQ160, such as, for example, GSM, WCDMA, LTE, NR, WiFi, or Bluetooth wireless technologies. These wireless technologies may be integrated into the same or different chip or set of chips and other components within network node QQ160.

Processing circuitry QQ170 is configured to perform any determining, calculating, or similar operations (e.g., certain obtaining operations) described herein as being provided by a network node. These operations performed by processing circuitry QQ170 may include processing information obtained by processing circuitry QQ170 by, for example, converting the obtained information into other information, comparing the obtained information or converted information to information stored in the network node, and/or performing one or more operations based on the obtained information or converted information, and as a result of said processing making a determination.

Processing circuitry QQ170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node QQ160 components, such as device readable medium QQ180, network node QQ160 functionality. For example, processing circuitry QQ170 may execute instructions stored in device readable medium QQ180 or in memory within processing circuitry QQ170. Such functionality may include providing any of the various wireless features, functions, or benefits discussed herein. In some embodiments, processing circuitry QQ170 may include a system on a chip (SOC).

In some embodiments, processing circuitry QQ170 may include one or more of radio frequency (RF) transceiver circuitry QQ172 and baseband processing circuitry QQ174. In some embodiments, radio frequency (RF) transceiver circuitry QQ172 and baseband processing circuitry QQ174 may be on separate chips (or sets of chips), boards, or units, such as radio units and digital units. In alternative embodiments, part or all of RF transceiver circuitry QQ172 and baseband processing circuitry QQ174 may be on the same chip or set of chips, boards, or units In certain embodiments, some or all of the functionality described herein as being provided by a network node, base station, eNB or other such network device may be performed by processing circuitry QQ170 executing instructions stored on device readable medium QQ180 or memory within processing circuitry QQ170. In alternative embodiments, some or all of the functionality may be provided by processing circuitry QQ170 without executing instructions stored on a separate or discrete device readable medium, such as in a hard-wired manner. In any of those embodiments, whether executing instructions stored on a device readable storage medium or not, processing circuitry QQ170 can be configured to perform the described functionality. The benefits provided by such functionality are not limited to processing circuitry QQ170 alone or to other components of network node QQ160, but are enjoyed by network node QQ160 as a whole, and/or by end users and the wireless network generally.

Device readable medium QQ180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry QQ170. Device readable medium QQ180 may store any suitable instructions, data or information, including a computer program, software, an application including one or more of logic, rules, code, tables, etc. and/or other instructions capable of being executed by processing circuitry QQ170 and, utilized by network node QQ160. Device readable medium QQ180 may be used to store any calculations made by processing circuitry QQ170 and/or any data received via interface QQ190.

In some embodiments, processing circuitry QQ170 and device readable medium QQ180 may be considered to be integrated.

Interface QQ190 is used in the wired or wireless communication of signaling and/or data between network node QQ160, network QQ106, and/or WDs QQ110. As illustrated, interface QQ190 comprises port(s)/terminal(s) QQ194 to send and receive data, for example to and from network QQ106 over a wired connection. Interface QQ190 also includes radio front end circuitry QQ192 that may be coupled to, or in certain embodiments a part of, antenna QQ162. Radio front end circuitry QQ192 comprises filters QQ198 and amplifiers QQ196. Radio front end circuitry QQ192 may be connected to antenna QQ162 and processing circuitry QQ170. Radio front end circuitry may be configured to condition signals communicated between antenna QQ162 and processing circuitry QQ170. Radio front end circuitry QQ192 may receive digital data that is to be sent out to other network nodes or WDs via a wireless connection. Radio front end circuitry QQ192 may convert the digital data into a radio signal having the appropriate channel and bandwidth parameters using a combination of filters QQ198 and/or amplifiers QQ196. The radio signal may then be transmitted via antenna QQ162. Similarly, when receiving data, antenna QQ162 may collect radio signals which are then converted into digital data by radio front end circuitry QQ192. The digital data may be passed to processing circuitry QQ170. In other embodiments, the interface may comprise different components and/or different combinations of components.

In certain alternative embodiments, network node QQ160 may not include separate radio front end circuitry QQ192, instead, processing circuitry QQ170 may comprise radio front end circuitry and may be connected to antenna QQ162 without separate radio front end circuitry QQ192. Similarly, in some embodiments, all or some of RF transceiver circuitry QQ172 may be considered a part of interface QQ190. In still other embodiments, interface QQ190 may include one or more ports or terminals QQ194, radio front end circuitry QQ192, and RF transceiver circuitry QQ172, as part of a radio unit (not shown), and interface QQ190 may communicate with baseband processing circuitry QQ174, which is part of a digital unit (not shown).

Antenna QQ162 may include one or more antennas, or antenna arrays, configured to send and/or receive wireless signals. Antenna QQ162 may be coupled to radio front end circuitry QQ190 and may be any type of antenna capable of transmitting and receiving data and/or signals wirelessly. In some embodiments, antenna QQ162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna QQ162 may be separate from network node QQ160 and may be connectable to network node QQ160 through an interface or port.

Antenna QQ162, interface QQ190, and/or processing circuitry QQ170 may be configured to perform any receiving operations and/or certain obtaining operations described herein as being performed by a network node. Any information, data and/or signals may be received from a wireless device, another network node and/or any other network equipment. Similarly, antenna QQ162, interface QQ190, and/or processing circuitry QQ170 may be configured to perform any transmitting operations described herein as being performed by a network node. Any information, data and/or signals may be transmitted to a wireless device, another network node and/or any other network equipment.

Power circuitry QQ187 may comprise, or be coupled to, power management circuitry and is configured to supply the components of network node QQ160 with power for performing the functionality described herein. Power circuitry QQ187 may receive power from power source QQ186. Power source QQ186 and/or power circuitry QQ187 may be configured to provide power to the various components of network node QQ160 in a form suitable for the respective components (e.g., at a voltage and current level needed for each respective component). Power source QQ186 may either be included in, or external to, power circuitry QQ187 and/or network node QQ160. For example, network node QQ160 may be connectable to an external power source (e.g., an electricity outlet) via an input circuitry or interface such as an electrical cable, whereby the external power source supplies power to power circuitry QQ187. As a further example, power source QQ186 may comprise a source of power in the form of a battery or battery pack which is connected to, or integrated in, power circuitry QQ187. The battery may provide backup power should the external power source fail. Other types of power sources, such as photovoltaic devices, may also be used.

Alternative embodiments of network node QQ160 may include additional components beyond those shown in FIG. 7 that may be responsible for providing certain aspects of the network node's functionality, including any of the functionality described herein and/or any functionality necessary to support the subject matter described herein. For example, network node QQ160 may include user interface equipment to allow input of information into network node QQ160 and to allow output of information from network node QQ160. This may allow a user to perform diagnostic, maintenance, repair, and other administrative functions for network node QQ160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A WD may support device-to-device (D2D) communication, for example by implementing a 3GPP standard for sidelink communication, vehicle-to-vehicle (V2V), vehicleto-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device QQ110 includes antenna QQ111, interface QQ114, processing circuitry QQ120, device readable medium QQ130, user interface equipment QQ132, auxiliary equipment QQ134, power source QQ136 and power circuitry QQ137. WD QQ110 may include multiple sets of one or more of the illustrated components for different wireless technologies supported by WD QQ110, such as, for example, GSM, WCDMA, LTE, NR, WiFi, WiMAX, or Bluetooth wireless technologies, just to mention a few. These wireless technologies may be integrated into the same or different chips or set of chips as other components within WD QQ110.

Antenna QQ111 may include one or more antennas or antenna arrays, configured to send and/or receive wireless signals, and is connected to interface QQ114. In certain alternative embodiments, antenna QQ111 may be separate from WD QQ110 and be connectable to WD QQ110 through an interface or port. Antenna QQ111, interface QQ114, and/or processing circuitry QQ120 may be configured to perform any receiving or transmitting operations described herein as being performed by a WD. Any information, data and/or signals may be received from a network node and/or another WD. In some embodiments, radio front end circuitry and/or antenna QQ111 may be considered an interface.

As illustrated, interface QQ114 comprises radio front end circuitry QQ112 and antenna QQ111. Radio front end circuitry QQ112 comprise one or more filters QQ118 and amplifiers QQ116. Radio front end circuitry QQ114 is connected to antenna QQ111 and processing circuitry QQ120, and is configured to condition signals communicated between antenna QQ111 and processing circuitry QQ120. Radio front end circuitry QQ112 may be coupled to or a part of antenna QQ111. In some embodiments, WD QQ110 may not include separate radio front end circuitry QQ112; rather, processing circuitry QQ120 may comprise radio front end circuitry and may be connected to antenna QQ111. Similarly, in some embodiments, some or all of RF transceiver circuitry QQ122 may be considered a part of interface QQ114. Radio front end circuitry QQ112 may receive digital data that is to be sent out to other network nodes or WDs via a wireless connection. Radio front end circuitry QQ112 may convert the digital data into a radio signal having the appropriate channel and bandwidth parameters using a combination of filters QQ118 and/or amplifiers QQ116. The radio signal may then be transmitted via antenna QQ111. Similarly, when receiving data, antenna QQ111 may collect radio signals which are then converted into digital data by radio front end circuitry QQ112. The digital data may be passed to processing circuitry QQ120. In other embodiments, the interface may comprise different components and/or different combinations of components.

Processing circuitry QQ120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD QQ110 components, such as device readable medium QQ130, WD QQ110 functionality. Such functionality may include providing any of the various wireless features or benefits discussed herein. For example, processing circuitry QQ120 may execute instructions stored in device readable medium QQ130 or in memory within processing circuitry QQ120 to provide the functionality disclosed herein, such as method 500 of FIG. 5.

As illustrated, processing circuitry QQ120 includes one or more of RF transceiver circuitry QQ122, baseband processing circuitry QQ124, and application processing circuitry QQ126. In other embodiments, the processing circuitry may comprise different components and/or different combinations of components. In certain embodiments processing circuitry QQ120 of WD QQ110 may comprise a SOC. In some embodiments, RF transceiver circuitry QQ122, baseband processing circuitry QQ124, and application processing circuitry QQ126 may be on separate chips or sets of chips. In alternative embodiments, part or all of baseband processing circuitry QQ124 and application processing circuitry QQ126 may be combined into one chip or set of chips, and RF transceiver circuitry QQ122 may be on a separate chip or set of chips. In still alternative embodiments, part or all of RF transceiver circuitry QQ122 and baseband processing circuitry QQ124 may be on the same chip or set of chips, and application processing circuitry QQ126 may be on a separate chip or set of chips. In yet other alternative embodiments, part or all of RF transceiver circuitry QQ122, baseband processing circuitry QQ124, and application processing circuitry QQ126 may be combined in the same chip or set of chips. In some embodiments, RF transceiver circuitry QQ122 may be a part of interface QQ114. RF transceiver circuitry QQ122 may condition RF signals for processing circuitry QQ120.

In certain embodiments, some or all of the functionality described herein as being performed by a WD may be provided by processing circuitry QQ120 executing instructions stored on device readable medium QQ130, which in certain embodiments may be a computer-readable storage medium. In alternative embodiments, some or all of the functionality may be provided by processing circuitry QQ120 without executing instructions stored on a separate or discrete device readable storage medium, such as in a hard-wired manner In any of those particular embodiments, whether executing instructions stored on a device readable storage medium or not, processing circuitry QQ120 can be configured to perform the described functionality. The benefits provided by such functionality are not limited to processing circuitry QQ120 alone or to other components of WD QQ110, but are enjoyed by WD QQ110 as a whole, and/or by end users and the wireless network generally.

Processing circuitry QQ120 may be configured to perform any determining, calculating, or similar operations (e.g., certain obtaining operations) described herein as being performed by a WD. These operations, as performed by processing circuitry QQ120, may include processing information obtained by processing circuitry QQ120 by, for example, converting the obtained information into other information, comparing the obtained information or converted information to information stored by WD QQ110, and/or performing one or more operations based on the obtained information or converted information, and as a result of said processing making a determination.

Device readable medium QQ130 may be operable to store a computer program, software, an application including one or more of logic, rules, code, tables, etc. and/or other instructions capable of being executed by processing circuitry QQ120. Device readable medium QQ130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry QQ120. In some embodiments, processing circuitry QQ120 and device readable medium QQ130 may be considered to be integrated.

User interface equipment QQ132 may provide components that allow for a human user to interact with WD QQ110. Such interaction may be of many forms, such as visual, audial, tactile, etc. User interface equipment QQ132 may be operable to produce output to the user and to allow the user to provide input to WD QQ110. The type of interaction may vary depending on the type of user interface equipment QQ132 installed in WD QQ110. For example, if WD QQ110 is a smart phone, the interaction may be via a touch screen; if WD QQ110 is a smart meter, the interaction may be through a screen that provides usage (e.g., the number of gallons used) or a speaker that provides an audible alert (e.g., if smoke is detected). User interface equipment QQ132 may include input interfaces, devices and circuits, and output interfaces, devices and circuits. User interface equipment QQ132 is configured to allow input of information into WD QQ110, and is connected to processing circuitry QQ120 to allow processing circuitry QQ120 to process the input information. User interface equipment QQ132 may include, for example, a microphone, a proximity or other sensor, keys/buttons, a touch display, one or more cameras, a USB port, or other input circuitry. User interface equipment QQ132 is also configured to allow output of information from WD QQ110, and to allow processing circuitry QQ120 to output information from WD QQ110. User interface equipment QQ132 may include, for example, a speaker, a display, vibrating circuitry, a USB port, a headphone interface, or other output circuitry. Using one or more input and output interfaces, devices, and circuits, of user interface equipment QQ132, WD QQ110 may communicate with end users and/or the wireless network, and allow them to benefit from the functionality described herein.

Auxiliary equipment QQ134 is operable to provide more specific functionality which may not be generally performed by WDs. This may comprise specialized sensors for doing measurements for various purposes, interfaces for additional types of communication such as wired communications etc. The inclusion and type of components of auxiliary equipment QQ134 may vary depending on the embodiment and/or scenario.

Power source QQ136 may, in some embodiments, be in the form of a battery or battery pack. Other types of power sources, such as an external power source (e.g., an electricity outlet), photovoltaic devices or power cells, may also be used. WD QQ110 may further comprise power circuitry QQ137 for delivering power from power source QQ136 to the various parts of WD QQ110 which need power from power source QQ136 to carry out any functionality described or indicated herein. Power circuitry QQ137 may in certain embodiments comprise power management circuitry. Power circuitry QQ137 may additionally or alternatively be operable to receive power from an external power source; in which case WD QQ110 may be connectable to the external power source (such as an electricity outlet) via input circuitry or an interface such as an electrical power cable. Power circuitry QQ137 may also in certain embodiments be operable to deliver power from an external power source to power source QQ136. This may be, for example, for the charging of power source QQ136. Power circuitry QQ137 may perform any formatting, converting, or other modification to the power from power source QQ136 to make the power suitable for the respective components of WD QQ110 to which power is supplied.

Figure 8:
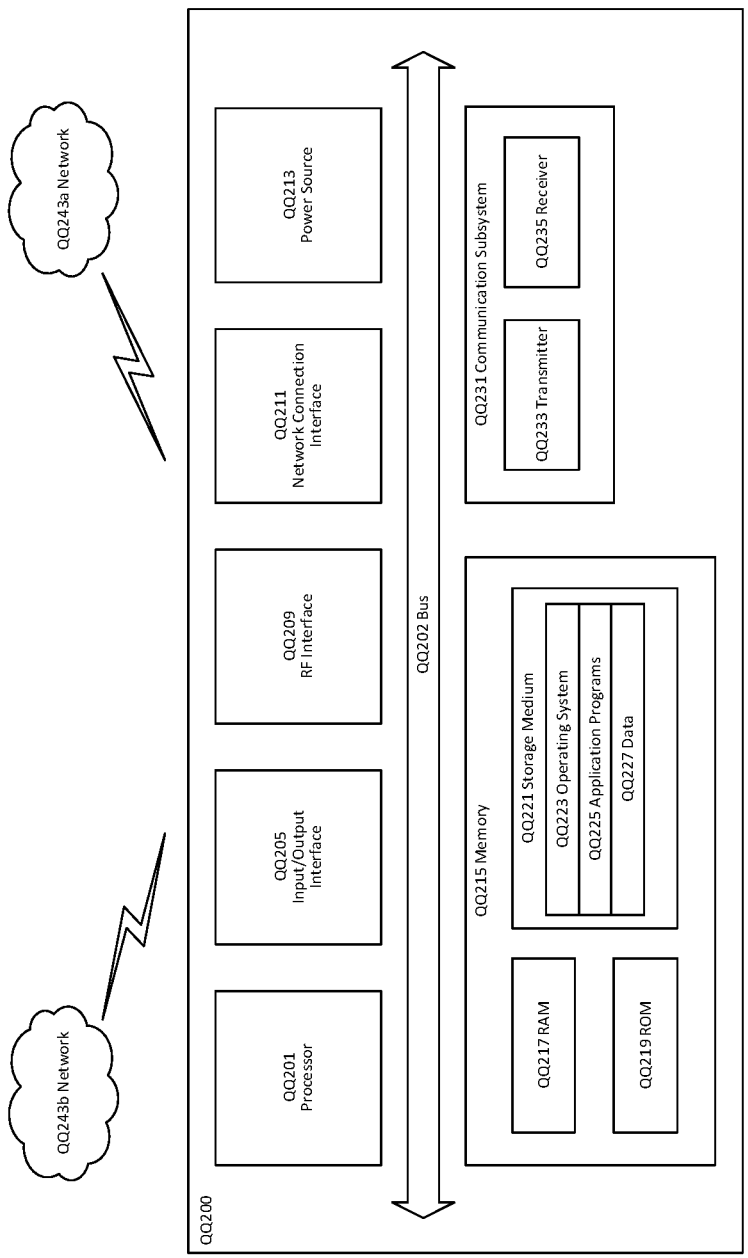
FIG. 8 illustrates a schematic block diagram of a wireless device/UE according to an embodiment.

FIG. 8 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE QQ2200 may be any UE identified by the 3$^{rd}$ Generation Partnership Project (3GPP), including a NB-IoT UE, a machine type communication (MTC) UE, and/or an enhanced MTC (eMTC) UE. UE QQ200, as illustrated in FIG. 8, is one example of a WD configured for communication in accordance with one or more communication standards promulgated by the 3$^{rd}$ Generation Partnership Project (3GPP), such as 3GPP's GSM, UMTS, LTE, and/or 5G standards. As mentioned previously, the term WD and UE may be used interchangeable. Accordingly, although FIG. 8 is a UE, the components discussed herein are equally applicable to a WD, and vice-versa.

In FIG. 8, UE QQ200 includes processing circuitry QQ201 that is operatively coupled to input/output interface QQ205, radio frequency (RF) interface QQ209, network connection interface QQ211, memory QQ215 including random access memory (RAM) QQ217, read-only memory (ROM) QQ219, and storage medium QQ221 or the like, communication subsystem QQ231, power source QQ233, and/or any other component, or any combination thereof. Storage medium QQ221 includes operating system QQ223, application program QQ225, and data QQ227. In other embodiments, storage medium QQ221 may include other similar types of information. Certain UEs may utilize all of the components shown in FIG. 8, or only a subset of the components. The level of integration between the components may vary from one UE to another UE. Further, certain UEs may contain multiple instances of a component, such as multiple processors, memories, transceivers, transmitters, receivers, etc.

In FIG. 8, processing circuitry QQ201 may be configured to process computer instructions and data. Processing circuitry QQ201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry QQ201 may include two central processing units (CPUs). Data may be information in a form suitable for use by a computer.

In the depicted embodiment, input/output interface QQ205 may be configured to provide a communication interface to an input device, output device, or input and output device. UE QQ200 may be configured to use an output device via input/output interface QQ205. An output device may use the same type of interface port as an input device. For example, a USB port may be used to provide input to and output from UE QQ200. The output device may be a speaker, a sound card, a video card, a display, a monitor, a printer, an actuator, an emitter, a smartcard, another output device, or any combination thereof. UE QQ200 may be configured to use an input device via input/output interface QQ205 to allow a user to capture information into UE QQ200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In Figure QQ2, RF interface QQ209 may be configured to provide a communication interface to RF components such as a transmitter, a receiver, and an antenna. Network connection interface QQ211 may be configured to provide a communication interface to network QQ243a. Network QQ243a may encompass wired and/or wireless networks such as a local-area network (LAN), a wide-area network (WAN), a computer network, a wireless network, a telecommunications network, another like network or any combination thereof. For example, network QQ243a may comprise a Wi-Fi network. Network connection interface QQ211 may be configured to include a receiver and a transmitter interface used to communicate with one or more other devices over a communication network according to one or more communication protocols, such as Ethernet, TCP/IP, SONET, ATM, or the like. Network connection interface QQ211 may implement receiver and transmitter functionality appropriate to the communication network links (e.g., optical, electrical, and the like). The transmitter and receiver functions may share circuit components, software or firmware, or alternatively may be implemented separately.

RAM QQ217 may be configured to interface via bus QQ202 to processing circuitry QQ201 to provide storage or caching of data or computer instructions during the execution of software programs such as the operating system, application programs, and device drivers. ROM QQ219 may be configured to provide computer instructions or data to processing circuitry QQ201. For example, ROM QQ219 may be configured to store invariant low-level system code or data for basic system functions such as basic input and output (I/O), startup, or reception of keystrokes from a keyboard that are stored in a non-volatile memory. Storage medium QQ221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium QQ221 may be configured to include operating system QQ223, application program QQ225 such as a web browser application, a widget or gadget engine or another application, and data file QQ227. Storage medium QQ221 may store, for use by UE QQ200, any of a variety of various operating systems or combinations of operating systems.

Storage medium QQ221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium QQ221 may allow UE QQ200 to access computer-executable instructions, application programs or the like, stored on transitory or non-transitory memory media, to off-load data, or to upload data. An article of manufacture, such as one utilizing a communication system may be tangibly embodied in storage medium QQ221, which may comprise a device readable medium.

In Figure QQ2, processing circuitry QQ201 may be configured to communicate with network QQ243b using communication subsystem QQ231. Network QQ243a and network QQ243b may be the same network or networks or different network or networks. Communication subsystem QQ231 may be configured to include one or more transceivers used to communicate with network QQ243b. For example, communication subsystem QQ231 may be configured to include one or more transceivers used to communicate with one or more remote transceivers of another device capable of wireless communication such as another WD, UE, or base station of a radio access network (RAN) according to one or more communication protocols, such as IEEE 802.QQ2, CDMA, WCDMA, GSM, LTE, UTRAN, WiMax, or the like. Each transceiver may include transmitter QQ233 and/or receiver QQ235 to implement transmitter or receiver functionality, respectively, appropriate to the RAN links (e.g., frequency allocations and the like). Further, transmitter QQ233 and receiver QQ235 of each transceiver may share circuit components, software or firmware, or alternatively may be implemented separately.

In the illustrated embodiment, the communication functions of communication subsystem QQ231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem QQ231 may include cellular communication, Wi-Fi communication, Bluetooth communication, and GPS communication. Network QQ243b may encompass wired and/or wireless networks such as a local-area network (LAN), a wide-area network (WAN), a computer network, a wireless network, a telecommunications network, another like network or any combination thereof. For example, network QQ243b may be a cellular network, a Wi-Fi network, and/or a near-field network. Power source QQ213 may be configured to provide alternating current (AC) or direct current (DC) power to components of UE QQ200.

The features, benefits and/or functions described herein may be implemented in one of the components of UE QQ200 or partitioned across multiple components of UE QQ200. Further, the features, benefits, and/or functions described herein may be implemented in any combination of hardware, software or firmware. In one example, communication subsystem QQ231 may be configured to include any of the components described herein. Further, processing circuitry QQ201 may be configured to communicate with any of such components over bus QQ202. In another example, any of such components may be represented by program instructions stored in memory that when executed by processing circuitry QQ201 perform the corresponding functions described herein. In another example, the functionality of any of such components may be partitioned between processing circuitry QQ201 and communication subsystem QQ231. In another example, the non-computationally intensive functions of any of such components may be implemented in software or firmware and the computationally intensive functions may be implemented in hardware.

Figure 9:
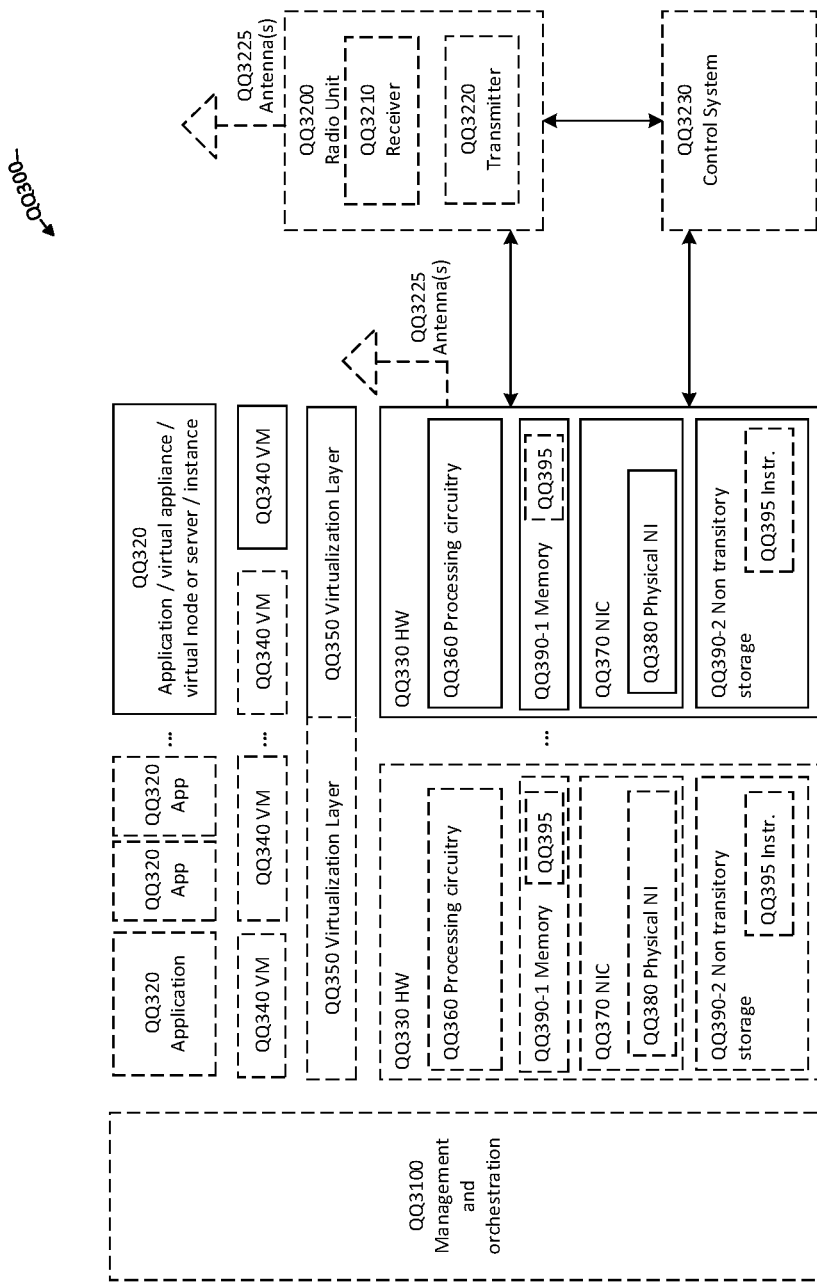
FIG. 9 illustrates a schematic block diagram illustrating a virtualization environment according to an embodiment.

FIG. 9 is a schematic block diagram illustrating a virtualization environment QQ300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments QQ300 hosted by one or more of hardware nodes QQ330. Further, in embodiments in which the virtual node is not a radio access node or does not require radio connectivity (e.g., a core network node), then the network node may be entirely virtualized.

The functions may be implemented by one or more applications QQ320 (which may alternatively be called software instances, virtual appliances, network functions, virtual nodes, virtual network functions, etc.) operative to implement some of the features, functions, and/or benefits of some of the embodiments disclosed herein. Applications QQ320 are run in virtualization environment QQ300 which provides hardware QQ330 comprising processing circuitry QQ360 and memory QQ390. Memory QQ390 contains instructions QQ395 executable by processing circuitry QQ360 whereby application QQ320 is operative to provide one or more of the features, benefits, and/or functions disclosed herein.

Virtualization environment QQ300, comprises general-purpose or special-purpose network hardware devices QQ330 comprising a set of one or more processors or processing circuitry QQ360, which may be commercial off-the-shelf (COTS) processors, dedicated Application Specific Integrated Circuits (ASICs), or any other type of processing circuitry including digital or analog hardware components or special purpose processors. Each hardware device may comprise memory QQ390-1 which may be non-persistent memory for temporarily storing instructions QQ395 or software executed by processing circuitry QQ360. Each hardware device may comprise one or more network interface controllers (NICs) QQ370, also known as network interface cards, which include physical network interface QQ380. Each hardware device may also include non-transitory, persistent, machine-readable storage media QQ390-2 having stored therein software QQ395 and/or instructions executable by processing circuitry QQ360. Software QQ395 may include any type of software including software for instantiating one or more virtualization layers QQ350 (also referred to as hypervisors), software to execute virtual machines QQ340 as well as software allowing it to execute functions, features and/or benefits described in relation with some embodiments described herein.

Virtual machines QQ340, comprise virtual processing, virtual memory, virtual networking or interface and virtual storage, and may be run by a corresponding virtualization layer QQ350 or hypervisor. Different embodiments of the instance of virtual appliance QQ320 may be implemented on one or more of virtual machines QQ340, and the implementations may be made in different ways.

During operation, processing circuitry QQ360 executes software QQ395 to instantiate the hypervisor or virtualization layer QQ350, which may sometimes be referred to as a virtual machine monitor (VMM). Virtualization layer QQ350 may present a virtual operating platform that appears like networking hardware to virtual machine QQ340.

As shown in FIG. 9, hardware QQ330 may be a stand-alone network node with generic or specific components. Hardware QQ330 may comprise antenna QQ3225 and may implement some functions via virtualization. Alternatively, hardware QQ330 may be part of a larger cluster of hardware (e.g. such as in a data center or customer premise equipment (CPE)) where many hardware nodes work together and are managed via management and orchestration (MANO) QQ3100, which, among others, oversees lifecycle management of applications QQ320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine QQ340 may be a software implementation of a physical machine that runs programs as if they were executing on a physical, non-virtualized machine. Each of virtual machines QQ340, and that part of hardware QQ330 that executes that virtual machine, be it hardware dedicated to that virtual machine and/or hardware shared by that virtual machine with others of the virtual machines QQ340, forms a separate virtual network elements (VNE).

Still in the context of NFV, Virtual Network Function (VNF) is responsible for handling specific network functions that run in one or more virtual machines QQ340 on top of hardware networking infrastructure QQ330 and corresponds to application QQ320 in FIG. 9.

In some embodiments, one or more radio units QQ3200 that each include one or more transmitters QQ3220 and one or more receivers QQ3210 may be coupled to one or more antennas QQ3225. Radio units QQ3200 may communicate directly with hardware nodes QQ330 via one or more appropriate network interfaces and may be used in combination with the virtual components to provide a virtual node with radio capabilities, such as a radio access node or a base station.

In some embodiments, some signaling can be effected with the use of control system QQ3230 which may alternatively be used for communication between the hardware nodes QQ330 and radio units QQ3200.

Figure 10:
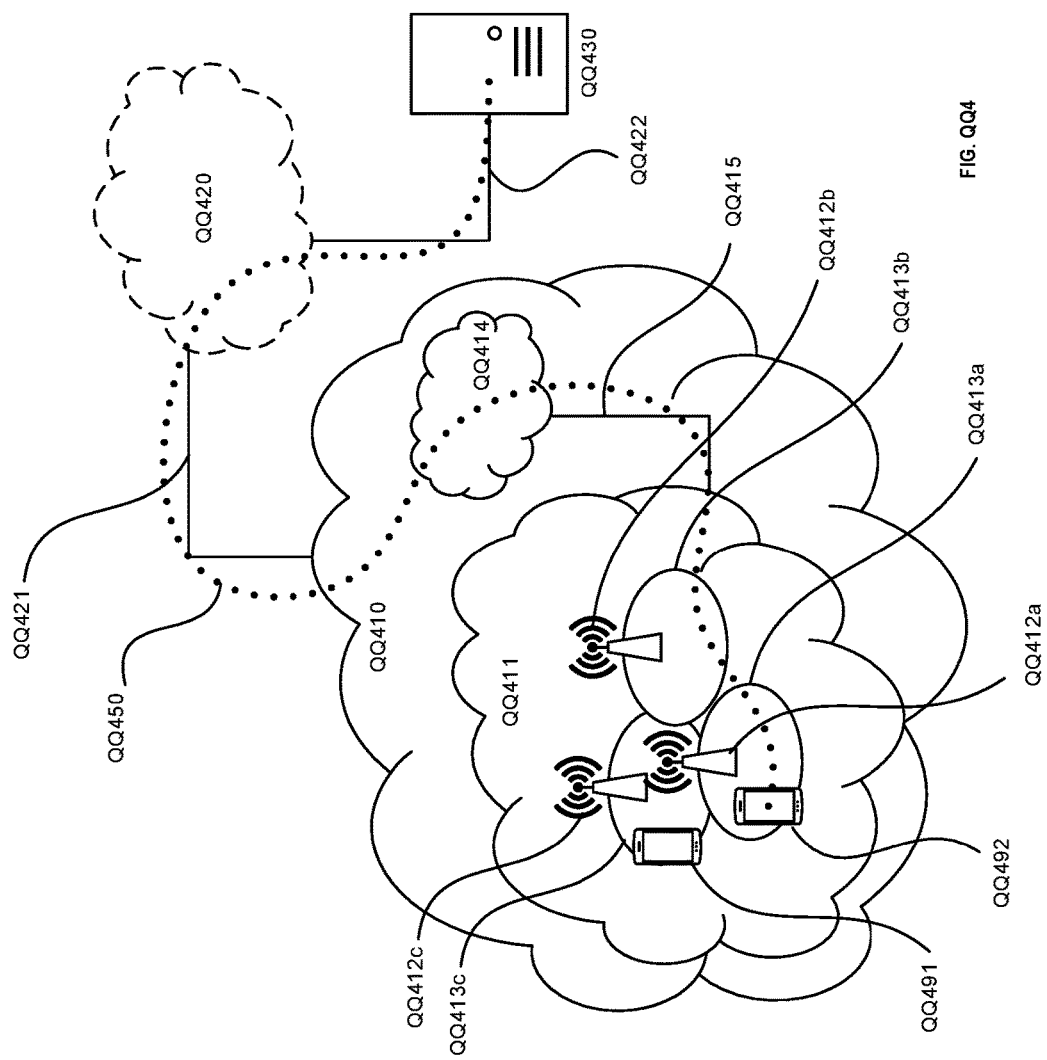
FIG. 10 illustrates a schematic block diagram of a telecommunication network connected via an intermediate network to a host computer, according to an embodiment.

With reference to FIG. 10, in accordance with an embodiment, a communication system includes telecommunication network QQ410, such as a 3GPP-type cellular network, which comprises access network QQ411, such as a radio access network, and core network QQ414. Access network QQ411 comprises a plurality of base stations QQ412a, QQ412b, QQ412c, such as NBs, eNBs, gNBs or other types of wireless access points, each defining a corresponding coverage area QQ413a, QQ413b, QQ413c. Each base station QQ412a, QQ412b, QQ412c is connectable to core network QQ414 over a wired or wireless connection QQ415. A first UE QQ491 located in coverage area QQ413c is configured to wirelessly connect to, or be paged by, the corresponding base station QQ412c. A second UE QQ492 in coverage area QQ413a is wirelessly connectable to the corresponding base station QQ412a. While a plurality of UEs QQ491, QQ492 are illustrated in this example, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 10 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signaling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

Example implementations, in accordance with an embodiment, of the UE, base station and host computer discussed in the preceding paragraphs will now be described with reference to FIG. 11. In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in FIG. 11) served by base station QQ520. Communication interface QQ526 may be configured to facilitate connection QQ560 to host computer QQ510. Connection QQ560 may be direct or it may pass through a core network (not shown in FIG. 11) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection.

Communication system QQ500 further includes UE QQ530 already referred to. Its hardware QQ535 may include radio interface QQ537 configured to set up and maintain wireless connection QQ570 with a base station serving a coverage area in which UE QQ530 is currently located. Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538. Software QQ531 includes client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

Figure 11:
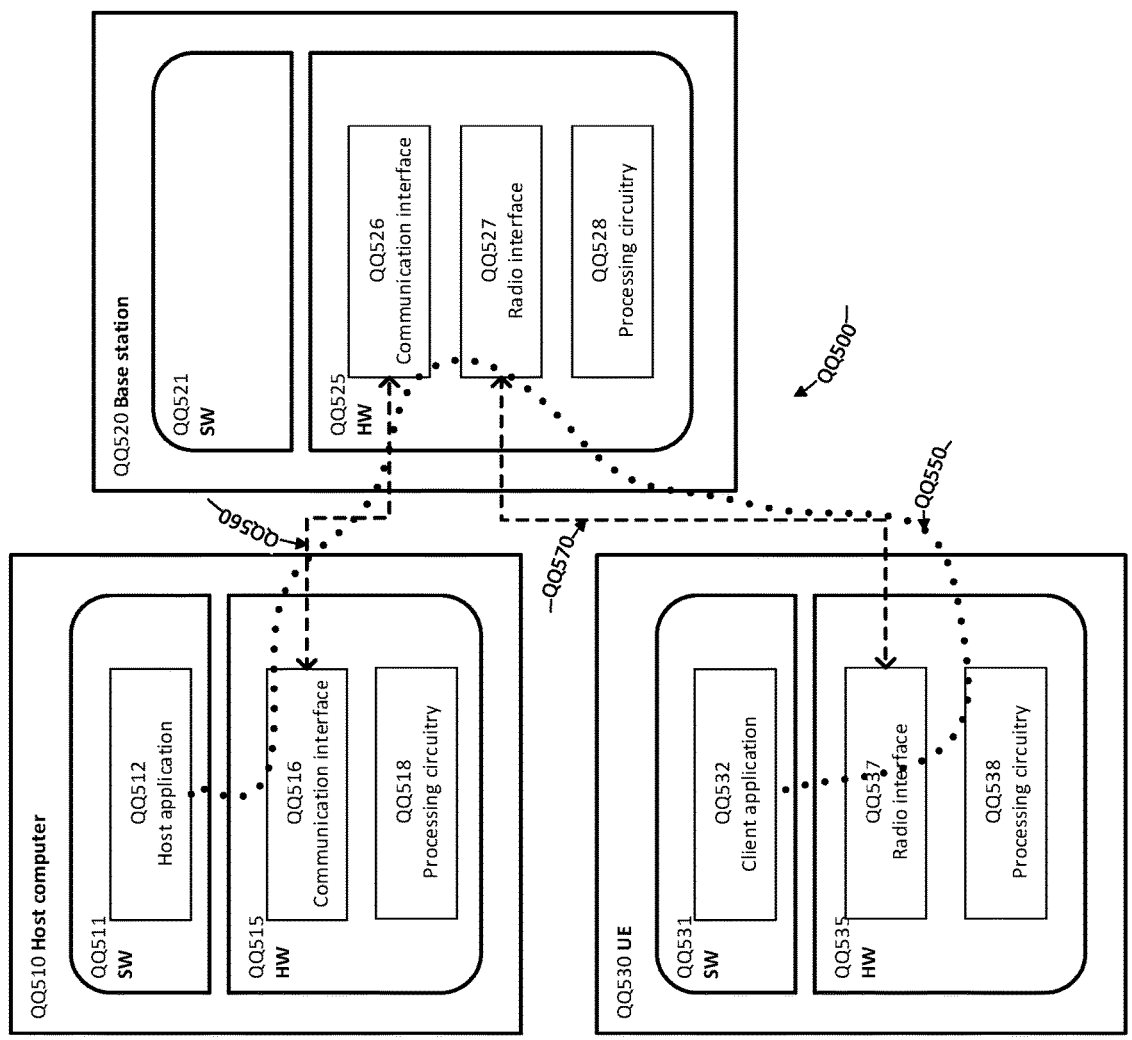
FIG. 11 illustrates a schematic block diagram of a host computer communicating via a base station with a user equipment over a partially wireless connection, according to an embodiment.

It is noted that host computer QQ510, base station QQ520 and UE QQ530 illustrated in FIG. 11 may be similar or identical to host computer QQ430, one of base stations QQ412a, QQ412b, QQ412c and one of UEs QQ491, QQ492 of FIG. 10, respectively. This is to say, the inner workings of these entities may be as shown in FIG. 11 and independently, the surrounding network topology may be that of FIG. 10.

In FIG. 11, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between UE QQ530 and base station QQ520 is in accordance with the teachings of the embodiments described throughout this disclosure. One or more of the various embodiments improve the performance of OTT services provided to UE QQ530 using OTT connection QQ550, in which wireless connection QQ570 forms the last segment.

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities. The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signaling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

Figure 12:
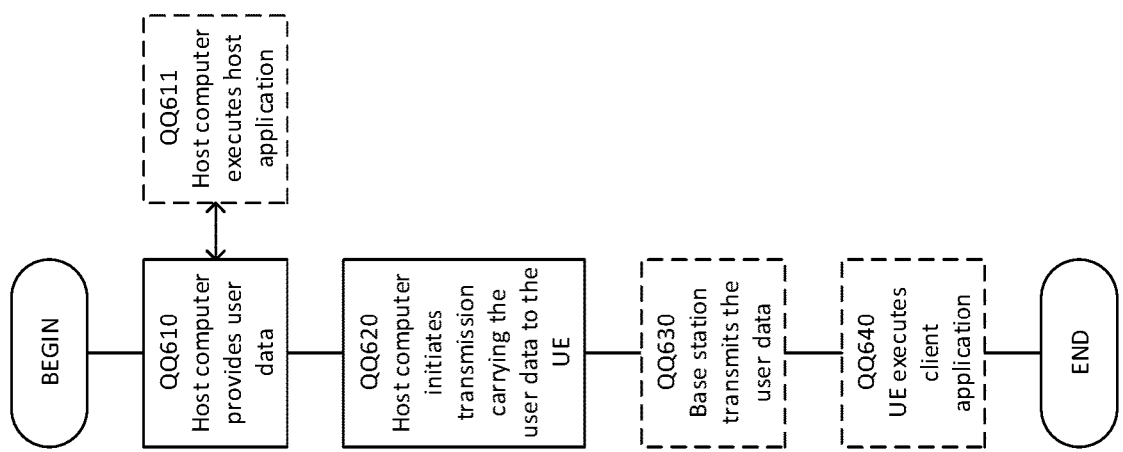
FIG. 12 is a flowchart illustrating a method implemented in a communication system including a host computer, a base station and a user equipment, according to an embodiment.

FIG. 12 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 12 will be included in this section. In step QQ610, the host computer provides user data. In substep QQ611 (which may be optional) of step QQ610, the host computer provides the user data by executing a host application. In step QQ620, the host computer initiates a transmission carrying the user data to the UE. In step QQ630 (which may be optional), the base station transmits to the UE the user data which was carried in the transmission that the host computer initiated, in accordance with the teachings of the embodiments described throughout this disclosure. In step QQ640 (which may also be optional), the UE executes a client application associated with the host application executed by the host computer.

Figure 13:
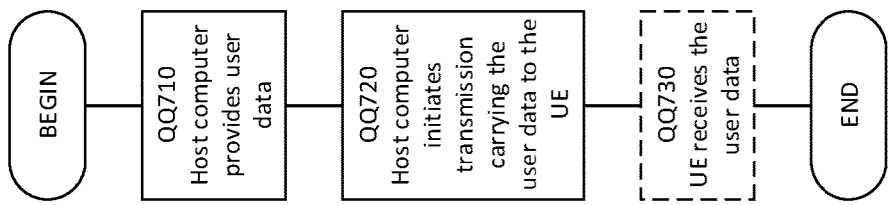
FIG. 13 is a flowchart illustrating a method implemented in a communication system including a host computer, a base station and a user equipment according to an embodiment.

FIG. 13 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 13 will be included in this section. In step QQ710 of the method, the host computer provides user data. In an optional substep (not shown) the host computer provides the user data by executing a host application. In step QQ720, the host computer initiates a transmission carrying the user data to the UE. The transmission may pass via the base station, in accordance with the teachings of the embodiments described throughout this disclosure. In step QQ730 (which may be optional), the UE receives the user data carried in the transmission.

Figures 14, 15:
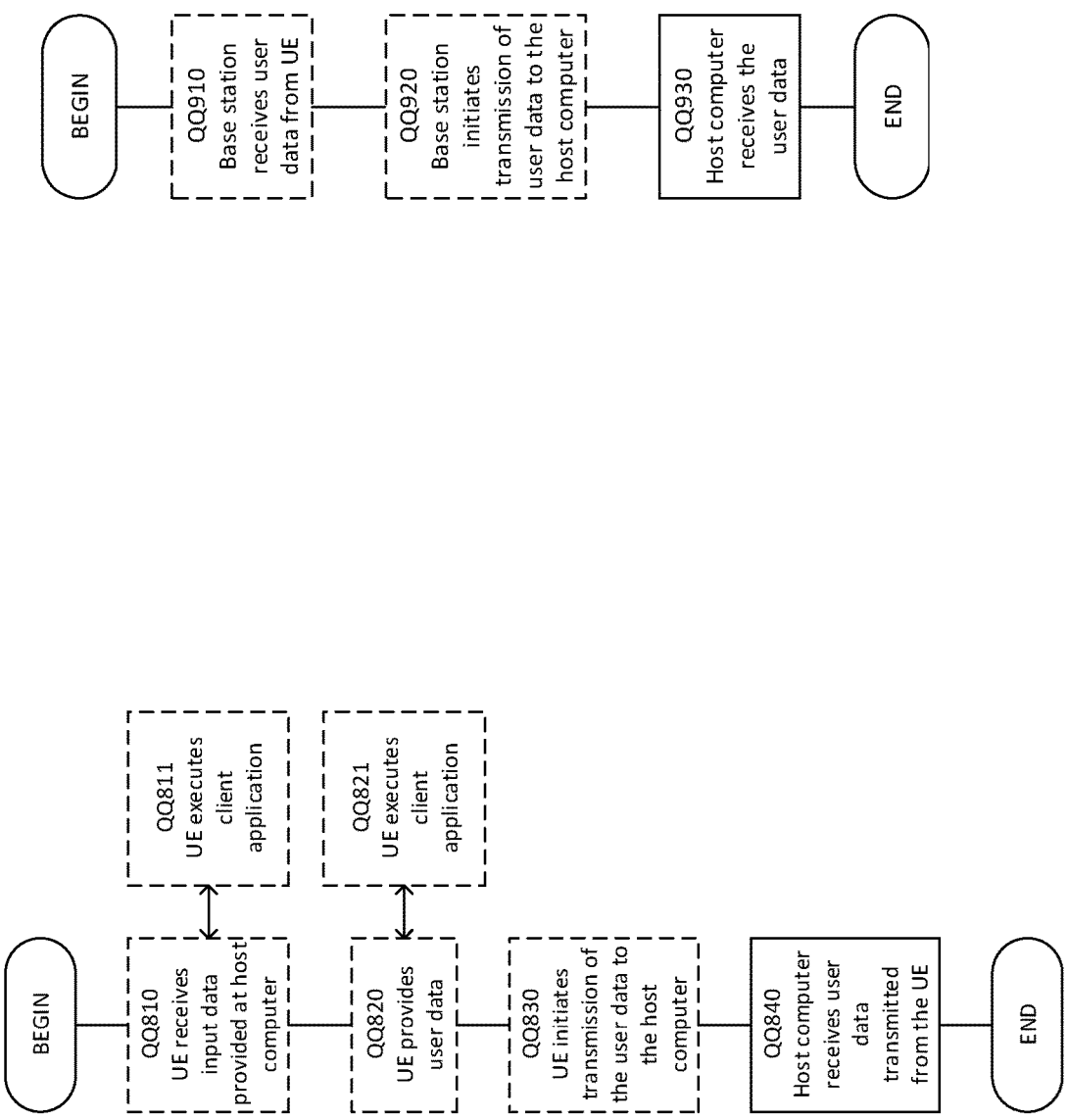
FIG. 14 is a flowchart illustrating a method implemented in a communication system including a host computer, a base station and a user equipment, according to an embodiment.
FIG. 15 is a flowchart illustrating a method implemented in a communication system including a host computer, a base station and a user equipment, according to an embodiment.

FIG. 14 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 14 will be included in this section. In step QQ810 (which may be optional), the UE receives input data provided by the host computer. Additionally or alternatively, in step QQ820, the UE provides user data. In substep QQ821 (which may be optional) of step QQ820, the UE provides the user data by executing a client application. In substep QQ811 (which may be optional) of step QQ810, the UE executes a client application which provides the user data in reaction to the received input data provided by the host computer. In providing the user data, the executed client application may further consider user input received from the user. Regardless of the specific manner in which the user data was provided, the UE initiates, in substep QQ830 (which may be optional), transmission of the user data to the host computer. In step QQ840 of the method, the host computer receives the user data transmitted from the UE, in accordance with the teachings of the embodiments described throughout this disclosure.

FIG. 15 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 15 will be included in this section. In step QQ910 (which may be optional), in accordance with the teachings of the embodiments described throughout this disclosure, the base station receives user data from the UE. In step QQ920 (which may be optional), the base station initiates transmission of the received user data to the host computer. In step QQ930 (which may be optional), the host computer receives the user data carried in the transmission initiated by the base station.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic.

What is claimed is:

1. A method, in a wireless device, for communicating with a network node using autonomous Uplink (UL) access, the method comprising:
    after sending a data transmission to a network node, starting a retransmission window associated with a feedback process of the data transmission, the retransmission window including a first timer; and
    detecting an absence of a feedback signal during a time period given by the first timer; in response to the detecting, retransmitting the data transmission after expiry of the first timer; and the method further comprising receiving a signal indicating an uplink grant for the feedback signal and in response to the receipt of the uplink grant signal, stopping the retransmission window.

2. The method of claim 1, wherein the first timer is configured to prohibit the wireless device to perform a retransmission of the data transmission within the time period given by the first timer.

3. The method of claim 1, wherein the first timer is associated with a Hybrid Automatic Repeat request (HARQ) identifier of the feedback process.

4. The method of claim 1, wherein sending the data transmission comprises sending a retransmission of the data transmission.

5. The method of claim 1, wherein the retransmission window further includes a second timer.

6. The method of claim 5, wherein the second timer is triggered at the expiry of the first timer and is configured to allow the wireless device to perform a retransmission of the data transmission.

7. The method of claim 5, further comprising triggering another second timer after the second timer expires when no retransmission of the data transmission is performed during a time window given by the second timer.

8. The method of claim 7, further comprising triggering a counter of the second timer for monitoring a number of times that the second timer is triggered.

9. A wireless device for communicating with a network node using autonomous Uplink (UL) access, the wireless device comprising:
    processing circuitry having a processor and a memory connected thereto, the memory containing instructions that, when executed, cause the wireless device to:
        after sending a data transmission to a network node, start a retransmission window associated with a feedback process of the data transmission, the retransmission window including a first timer;
        in response to detecting an absence of a feedback signal during a time period given by the first timer, retransmit the data transmission after expiry of the first timer; receive a signal indicating an uplink grant for the feedback signal and in response to the receipt of the uplink grant signal, stop the retransmission window; and
    power supply circuitry configured to supply power to the wireless device.

10. The wireless device of claim 9, wherein the first timer is configured to prohibit the wireless device to perform a retransmission of the data transmission within the time period given by the first timer.

11. The wireless device of claim 9, wherein the first timer is associated with a Hybrid Automatic Repeat request (HARQ) identifier of the feedback process.

12. The wireless device of claim 9, wherein the processor is configured to send the data transmission or send a retransmission of the data transmission.

13. The wireless device of claim 9, wherein the processor is configured to stop the first timer upon reception of the feedback signal during the time period given by the first timer.

14. The wireless device of claim 9, wherein the retransmission window further includes a second timer.

15. The wireless device of claim 14, wherein the processor is configured to trigger the second timer at the expiry of the first timer and wherein the second timer is configured to allow the wireless device to perform a retransmission of the data transmission.

16. The wireless device of claim 14, wherein the processor is configured to trigger another second timer after the second timer expires when no retransmission of the data transmission is performed during a time period given by the second timer.

17. The wireless device of claim 16, wherein the processor is configured to trigger a counter of the second timer for monitoring a number of times that the second timer is triggered.

* * * * *

UNITED STATES PATENT AND TRADEMARK OFFICE
CERTIFICATE OF CORRECTION

PATENT NO. : 11,196,516 B2
APPLICATION NO. : 16/636438
DATED : December 7, 2021
INVENTOR(S) : Belleschi et al.

Page 1 of 2

It is certified that error appears in the above-identified patent and that said Letters Patent is hereby corrected as shown below:

In the Drawings

In Fig. 7, Sheet 6 of 12, for Tag "QQ122", in Line 2, delete "Tranceiver" and insert -- Transceiver --, therefor.

In Fig. 7, Sheet 6 of 12, for Tag "QQ172", in Line 1, delete "Tranceiver" and insert -- Transceiver --, therefor.

In Fig. 7, Sheet 6 of 12, delete "Figure QQ1".

In Fig. 10, Sheet 9 of 12, delete "FIG. QQ4".

In the Specification

In Column 1, Line 55, delete "base-station" and insert -- base station --, therefor.

In Column 2, Line 5, delete "message (SR)." and insert -- (SR) message. --, therefor.

In Column 10, Line 53, delete "HARQ RTT 230" and insert -- HARQ RTT timer 230 --, therefor.

In Column 10, Line 61, delete "Identity (LCIDs)." and insert -- Identities (LCIDs). --, therefor.

In Column 11, Line 17, delete "timers" and insert -- timer's --, therefor.

In Column 11, Line 33, delete "HARQ timer 330" and insert -- HARQ RTT timer 330 --, therefor.

In Column 14, Line 38, delete "command Depending" and insert -- command. Depending --, therefor.

In Column 15, Line 40, delete "process" and insert -- process. --, therefor.

Signed and Sealed this
Twelfth Day of July, 2022

Katherine Kelly Vidal
*Director of the United States Patent and Trademark Office*

CERTIFICATE OF CORRECTION (continued)
U.S. Pat. No. 11,196,516 B2

In Column 15, Line 54, delete "acknowledged that" and insert -- acknowledge the --, therefor.

In Column 17, Line 34, delete "microprocessor" and insert -- microprocessors --, therefor.

In Column 17, Line 50, delete "according one" and insert -- according to one --, therefor.

In Column 18, Line 18, delete "Communications (GSM)," and insert -- (GSM) Communications, --, therefor.

In Column 20, Line 29, delete "units" and insert -- units. --, therefor.

In Column 21, Lines 46-47, delete "radio front end circuitry QQ190" and insert -- radio front end circuitry QQ192 --, therefor.

In Column 23, Line 52, delete "Radio front end circuitry QQ114" and insert -- Radio front end circuitry QQ112 --, therefor.

In Column 24, Line 60, delete "manner In" and insert -- manner. In --, therefor.

In Column 26, Line 38, delete "UE QQ2200" and insert -- UE QQ200 --, therefor.

In Column 26, Line 47, delete "interchangeable." and insert -- interchangeably. --, therefor.

In Column 26, Line 56, delete "power source QQ233," and insert -- transmitter QQ233, --, therefor.

In Column 27, Line 41, delete "Figure QQ2," and insert -- FIG. 8, --, therefor.

In Column 28, Line 30, delete "identity (SIM/RUIM) module," and insert -- identity module (SIM/RUIM), --, therefor.

In Column 28, Line 39, delete "Figure QQ2," and insert -- FIG. 8, --, therefor.

In Column 28, Line 52, delete "IEEE 802.QQ2," and insert -- IEEE 802.11, --, therefor.

In Column 30, Line 65, delete "elements (VNE)." and insert -- elements (VNEs). --, therefor.

In Column 33, Line 61, delete "etc.; the" and insert -- etc. The --, therefor.